(12) United States Patent
Nakajima

(10) Patent No.: US 7,760,227 B2
(45) Date of Patent: Jul. 20, 2010

(54) DEFLECTOR, OPTICAL SCANNING UNIT, AND IMAGE FORMING APPARATUS

(75) Inventor: Tomohiro Nakajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 409 days.

(21) Appl. No.: 11/765,166

(22) Filed: Jun. 19, 2007

(65) Prior Publication Data

US 2008/0024590 A1 Jan. 31, 2008

(30) Foreign Application Priority Data

Jul. 27, 2006 (JP) .............................. 2006-205431

(51) Int. Cl.
*B41J 15/14* (2006.01)
*B41J 27/00* (2006.01)
(52) U.S. Cl. ...................................... 347/243; 347/259
(58) Field of Classification Search ................. 347/231, 347/237, 243, 259, 260; 359/213.1, 214.1, 359/215.1, 221.1, 196.1, 199.1
See application file for complete search history.

(56) References Cited

U.S. PATENT DOCUMENTS

| | | | |
|---|---|---|---|
| 5,767,666 A * | 6/1998 | Asada et al. ................... 324/97 |
| 6,654,158 B2 * | 11/2003 | Helsel et al. ................. 359/292 |
| 6,657,765 B2 | 12/2003 | Hayashi et al. | |
| 6,803,938 B2 * | 10/2004 | Turner ......................... 347/237 |
| 6,972,883 B2 | 12/2005 | Fujii et al. | |
| 6,995,885 B2 | 2/2006 | Nakajima | |
| 7,031,040 B2 * | 4/2006 | Fujii et al. ................ 359/199.1 |
| 7,068,296 B2 | 6/2006 | Hayashi et al. | |
| 7,221,493 B2 | 5/2007 | Fujii et al. | |
| 2002/0122217 A1 | 9/2002 | Nakajima | |
| 2003/0053156 A1 | 3/2003 | Satoh et al. | |
| 2003/0072066 A1* | 4/2003 | Hayashi et al. ............. 359/201 |
| 2004/0036936 A1 | 2/2004 | Nakajima et al. | |
| 2005/0179972 A1* | 8/2005 | Nomura et al. ............. 359/196 |
| 2005/0185237 A1 | 8/2005 | Nakajima | |

(Continued)

FOREIGN PATENT DOCUMENTS

JP 2924200 5/1999

(Continued)

OTHER PUBLICATIONS

U.S. Appl. No. 12/028,446, filed Feb. 8, 2008, Nakamura et al.

(Continued)

*Primary Examiner*—Hai C Pham
(74) *Attorney, Agent, or Firm*—Oblon, Spivak, McClelland, Maier & Neustadt, L.L.P.

(57) ABSTRACT

A deflector includes a vibrating mirror supported by a torsion beam provided as a rotational axis and reciprocally scanning a beam from a light emitting source; and a rotational part configured to give a rotational torque to the vibrating mirror for making oscillation. The rotational part generates the rotational torque along one side separated from the rotational axis by length R in a direction perpendicular to the rotational axis. The vibration mirror has relationships of $$R<r, D>d, \text{ and } D \geq d \cdot (r/R)^2$$

where width in a direction perpendicular to the rotational axis of a mirror part that is a part of the vibrating mirror is 2r; width in a direction parallel with the rotational axis of the mirror part is d; and width of the separated one side causing generation of the rotational torque is D.

10 Claims, 14 Drawing Sheets

U.S. PATENT DOCUMENTS

| | | |
|---|---|---|
| 2005/0243396 A1 * | 11/2005 | Fujii et al. .................. 359/224 |
| 2006/0012844 A1 | 1/2006 | Fujii et al. |
| 2006/0028533 A1 | 2/2006 | Nakajima |
| 2006/0232660 A1 | 10/2006 | Nakajima et al. |
| 2006/0245009 A1 | 11/2006 | Akiyama et al. |

FOREIGN PATENT DOCUMENTS

| | | |
|---|---|---|
| JP | 3011144 | 12/1999 |
| JP | 2002-40355 | 2/2002 |
| JP | 2002-228965 | 8/2002 |
| JP | 2003-98459 | 4/2003 |
| JP | 3445691 | 6/2003 |
| JP | 3543473 | 4/2004 |
| JP | 2005-24721 | 1/2005 |

OTHER PUBLICATIONS

U.S. Appl. No. 11/561,702, filed Nov. 20, 2006, Tomohiro Nakajima.
U.S. Appl. No. 11/609,098, filed Dec. 11, 2006, Tomohiro Nakajima.
U.S. Appl. No. 12/051,404, filed Mar. 19, 2008, Amada et al.

* cited by examiner

DEFLECTOR, OPTICAL SCANNING UNIT, AND IMAGE FORMING APPARATUS

BACKGROUND OF THE INVENTION

1. Field of the Invention

The present invention generally relates to deflectors, optical scanning units, and image forming apparatuses, and more specifically, to a deflector using a vibrating mirror, an optical scanning unit using the deflector, and an image forming apparatus.

2. Description of the Related Art

In conventional optical scanning units, polygon mirrors or galvanometer mirrors are used to deflect beams for writing images. In order to achieve high-resolution high-speed printing operations, the rotational speed of these mirrors has to be increased. However, there is a ceiling to increasing the rotational speed of the mirror because of various reasons, such as limitation in durability of the bearings, heat generation due to air resistance, and noise.

On the other hand, optical deflectors making use of micromachining of silicon have been researched and studied. A technique for monolithically and integrally fabricating a vibrating mirror (movable mirror), together with a torsion bar supporting the mirror on its axis, from a silicon substrate, has been suggested.

In this type, namely the integrally fabricated vibrating mirror with the torsion bar, the size of the mirror surface is small. Hence, one of the advantages of this type is that the reciprocating motion of the mirror is produced by resonance, and that high-speed operation is achieved. In addition, noise and power consumption are reduced because less driving force is required to swing the vibrating mirror.

However, in order to secure an angle of view equivalent to the polygon mirror, it is necessary to form a rotational torque in a wider scan angle range.

To solve this problem, for example, Japanese Laid-Open Patent Application Publication No. 2005-24721 describes a deflection mirror whereby a rotational torque is generated in the vicinity of a rotational axis.

More specifically, the deflection mirror described in Japanese Laid-Open Patent Application Publication No. 2005-24721 has a movable mirror which deflects a light beam; a torsion beam connected to the movable mirror and that defines the center of turning; and mirror oscillation means which generates torque to oscillate the movable mirror. The mirror oscillation means is provided adjacent to the movable mirror in the direction of the turning axis, and the torque is generated on the part at which $r' <= A/4$ is satisfied, where $r'$ stands for the distance between the movable mirror and the center of turning and A stands for the width (both wings) of the movable mirror.

In order to apply the deflector to an optical scanning unit having plural image forming stations and corresponding to a tandem type where a color image is formed by superposing the plural color images, as discussed in Japanese Laid-Open Patent Application Publication No. 2003-98459, it is necessary to provide plural vibrating mirrors and drive these mirrors at a common scanning frequency. However, the common scanning frequencies may not always coincide because of the moment of inertia of the vibrating units and the spring constant of the twisting members, which tend to vary due to the fluctuations in dimensions caused during the manufacturing process.

In response to this problem, for example, Japanese Laid-Open Patent Application Publication No. 2004-40355 describes a technique where mass load parts are provided at both ends of a mirror. In addition, Japanese Laid-Open Patent Application Publication No. 2002-228965 describes a technique where a torsion beam and a mirror part are simultaneously processed so as to achieve the resonance frequency.

As discussed above, by using the vibrating mirror instead of the polygon mirror, noise and power consumption can be reduced so that it is possible to provide an image forming apparatus suitable for an office environment.

Especially, in the optical scanning unit corresponding to the "tandem type", a temperature distribution is generated in the housing receiving the optical scanning unit due to heat from the polygon mirror and the position of a reflection mirror or a scanning lens of an image formation optical system may be changed due to thermal strain. This may cause color drift or color change. If the increase of the temperature is prevented in the case of using a vibrating mirror, it is possible to form an image with high quality.

However, in the case of the vibrating mirror compared to the polygon mirror, first, there is a disadvantage in that the mirror surface is small.

Second, in this case, the scan angle is small. In order words, as the scanning frequency increases in accordance with scanning speed enhancement, the scan angle may be unable to catch up with the speed. Another limit is that the amount of the rotation angle per unit time drastically decreases in accordance with sinusoidal vibration as the scan angle nears its peak.

For this reason, only about half the entire scan angle can be effectively used when trying to achieve even dot intervals on the scanned surface.

Moreover, it is preferable to have a smaller image formation spot diameter to bring the shape of the latent image potential distribution closer to rectangular and thus improve the resolution and maintain the evenness of the dot diameters. However, a Gaussian beam, in general, has the image formation property that $\omega 0/\omega$ is proportionate to the focal distance f of the image formation lens, where the diameter of the beam incident on the image formation lens is represented as $\omega 0$ and the diameter of the image formation spot is represented as $\omega$.

This means that, when the angle of view becomes small with an insufficient scan angle, the focal distance f of the image formation lens inevitably becomes greater. To shrink the spot, the diameter of the beam $\omega 0$ needs to be increased, which means the mirror surface needs to be increased. For this reason, the situation is becoming more difficult to ensure a sufficient scan angle.

FIG. 1 is a view of the plate-shaped movable mirror and a graph.

A movable mirror shaped like a simple plate as shown in FIG. 1 will be considered.

The dimensions of the movable mirror are determined as 2r in width in a direction orthogonal to the rotational axis, d in width in a direction parallel to the rotational axis, and t in thickness. The dimensions of each twisting member are determined as h in length, and a in width. When the density of Si is $\rho$, and the material constant is G, the moment of inertia $I=(4\rho r d t/3) \cdot r^2$, and the spring constant $K=(G/2h) \cdot \{at(a^2+t^2)/12\}$. Thus, the resonance frequency f0 is:

$$f0 = (1/2\pi) \cdot \sqrt{(K/I)} = (1/2\pi) \cdot \sqrt{\{Gat(a^2+t^2)/24LI\}}$$

The length of the torsion member h is almost proportional to the scan angle θ, and thus the scan angle θ can be expressed by:

$$\theta = \kappa/I \cdot f0^2, \text{where } \kappa \text{ is a constant.} \tag{1}$$

This means that the scan angle θ is inversely proportional to the moment of inertia I, and to increase the resonance frequency f0, the moment of inertia I must be reduced, or otherwise the scan angle θ would decrease. In other words, if 2r, the width in a direction orthogonal to the rotational axis, is simply increased, the scan angle θ would decrease in inverse proportion to the cube of the magnification factor.

On the other hand, the relationship between the torque T and the scan angle θ can be expressed by:

$$\theta = \kappa' \cdot T/K \text{ where } \kappa' \text{ is a constant.} \quad (2)$$

This means that, in order to secure the scan angle θ even if 2r, the width in a direction orthogonal to the rotational axis, is increased, it is necessary to generate the torque T proportion to the cube of the magnification factor.

In other words, since the rotational torque corresponding to a mirror surface size is generated and, as discussed above, the common frequency varies if plural vibrating mirrors are mixed, a method for securing the scan angle θ even if these are oscillated by a common scanning frequency fd is desirable.

SUMMARY OF THE INVENTION

Accordingly, embodiments of the present invention may provide a novel and useful deflector, optical scanning unit, and image forming apparatus solving one or more of the problems discussed above.

More specifically, the embodiments of the present invention may provide a deflector, an optical scanning unit, and an image forming apparatus whereby a designated scan angle is obtained while a mirror surface size for shrinking a minute spot diameter corresponding to color image forming is secured so that the vibrating mirror as the deflector is applied to the optical scanning unit corresponding to the tandem type and high quality image forming having no color drift or color change can be made with low noise and power consumption.

One aspect of the present invention may be to provide a deflector, including:

a vibrating mirror supported by a torsion beam provided as a rotational axis and reciprocally scanning a beam from a light emitting source; and a rotational part configured to give a rotational torque to the vibrating mirror for making oscillation;

wherein the rotational part generates the rotational torque along one side separated from the rotational axis by length R in a direction perpendicular to the rotational axis; and the vibration mirror has relationships of $$R<r, D>d, \text{ and } D \geqq d \cdot (r/R)^2$$

where width in a direction perpendicular to the rotational axis of a mirror part that is a part of the vibrating mirror is 2r; width in a direction parallel with the rotational axis of the mirror part is d; and width of the separated one side causing generation of the rotational torque is D.

Another aspect of the present invention may be to provide an optical scanning unit, including:

a deflector including a vibrating mirror supported by a torsion beam provided as a rotational axis and reciprocally scanning a light beam from a light emitting source; and a rotational part configured to give a rotational torque to the vibrating mirror for making oscillation;

wherein the rotational part generates the rotational torque along one side separated from the rotational axis by length R in a direction perpendicular to the rotational axis;

the vibration mirror has relationships of $$R<r, D>d, \text{ and } D \geqq d \cdot (r/R)^2$$

where width in a direction perpendicular to the rotational axis of a mirror part that is a part of the vibrating mirror is 2r; width in a direction parallel with the rotational axis of the mirror part is d; and width of the separated one side causing generation of the rotational torque is D;

the light beam from the light source is deflected and a spot shape is formed by an image-formation optical system, so that a surface is scanned; and the light source is provided so that the light beam is deflected toward the rotational axis of the vibrating mirror.

Other aspect of the present invention may be to provide an image forming apparatus wherein an electrostatic image is recorded on an image carrier by a light beam from a light source device modulated by an image signal and the electrostatic image is transformed by a toner so as to be transferred to a recording medium, the image forming apparatus including:

an optical scanning unit having a deflector including a vibrating mirror supported by a torsion beam provided as a rotational axis and reciprocally scanning the light beam from the light source device; and a rotational part configured to give a rotational torque to the vibrating mirror for making oscillation;

wherein the rotational part generates the rotational torque along one side separated from the rotational axis by length R in a direction perpendicular to the rotational axis;

the vibration mirror has relationships of $$R<r, D>d, \text{ and } D \geqq d \cdot (r/R)^2$$

where width in a direction perpendicular to the rotational axis of a mirror part that is a part of the vibrating mirror is 2r; width in a direction parallel with the rotational axis of the mirror part is d; and width of the separated one side causing generation of the rotational torque is D;

a light beam from a light source device is deflected and a spot shape is formed by an image-formation optical system, so that a surface is scanned; and the light source device is provided so that the light beam is deflected toward the rotational axis of the vibrating mirror.

According to embodiments of the present invention, it is possible to provide a deflector, an optical scanning unit, and an image forming apparatus whereby a designated scan angle is obtained while a mirror surface size for shrinking a minute spot diameter corresponding to color image forming is secured so that the vibrating mirror as the deflector is applied to the optical scanning unit corresponding to the tandem type and high quality image forming having no color drift or color change can be made with low noise and power consumption.

Other objects, features, and advantages of the present invention will be come more apparent from the following detailed description when read in conjunction with the accompanying drawings.

DETAILED DESCRIPTION OF THE PREFERRED EMBODIMENTS

A description is given below, with reference to the FIG. 2 through FIG. 14 of embodiments of the present invention.

First Embodiment of the Present Invention

First, a deflector of an embodiment of the present invention is discussed.

Figure 1:
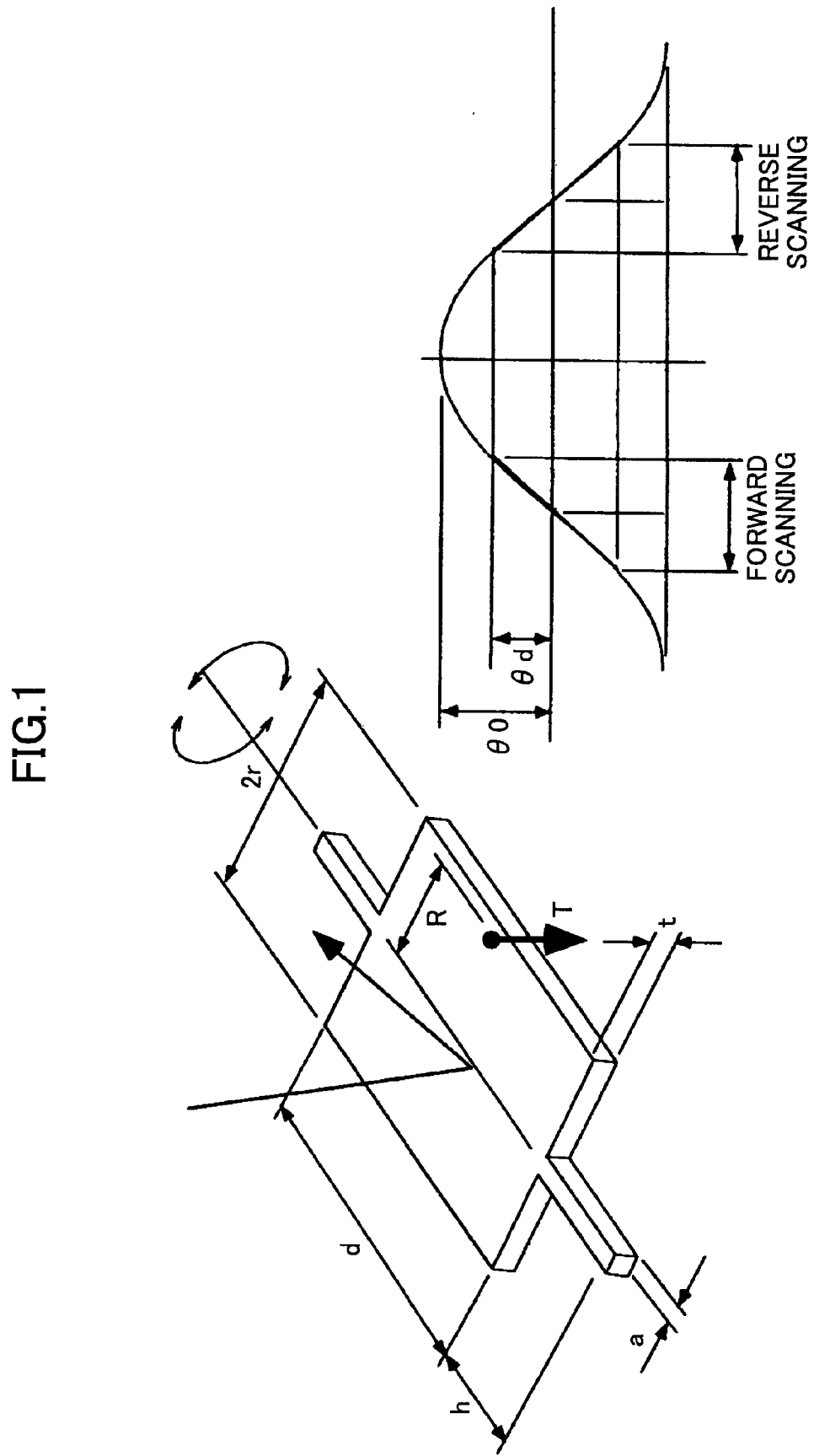
FIG. 1 is a view of a plate-shaped movable mirror and a graph.
Figure 2:
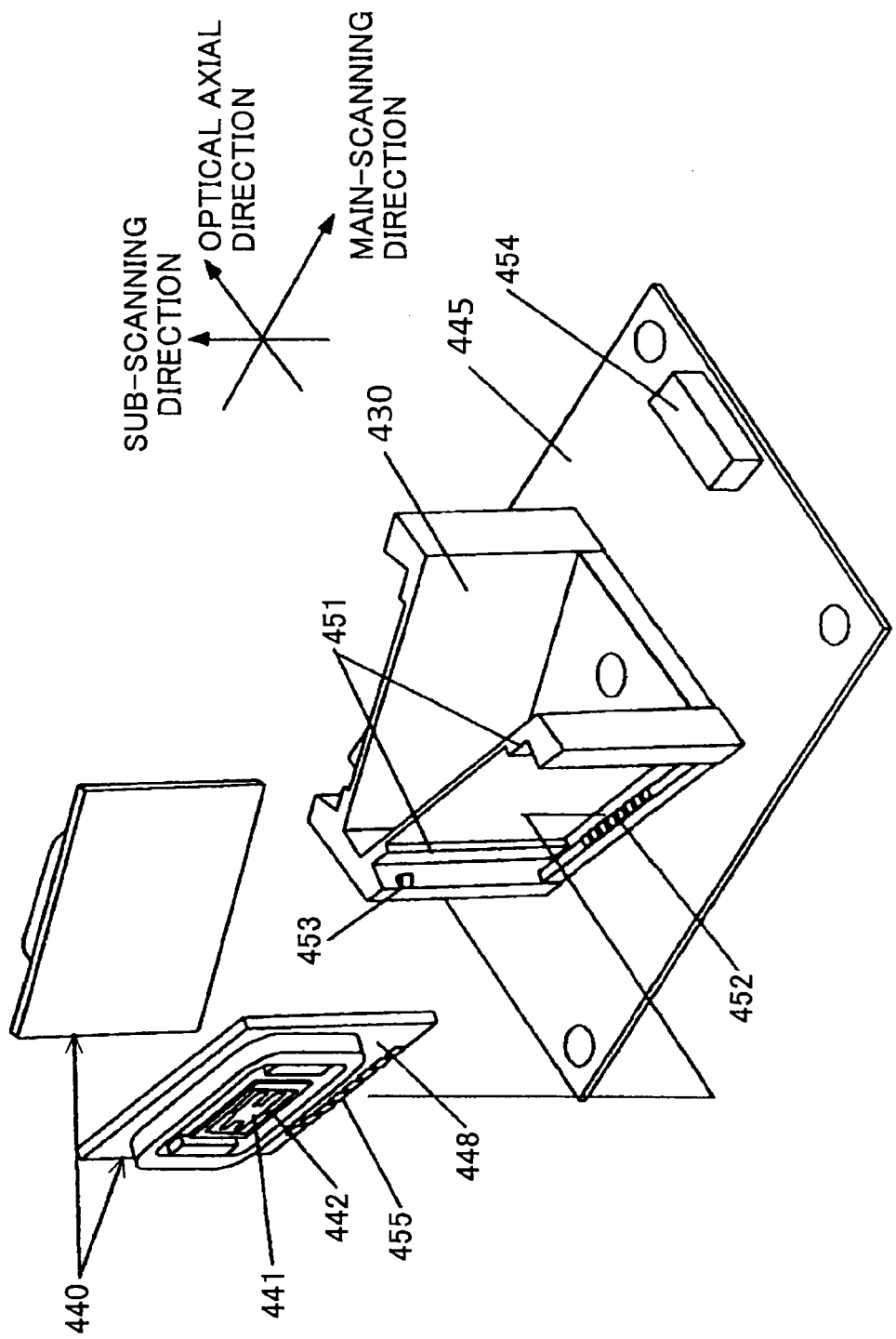
FIG. 2 is a schematic view of a deflector of an embodiment of the present invention.

FIG. 2 is a schematic view of a deflector of the embodiment of the present invention. The optical scanning device includes the vibrating mirror module according to the first embodiment. Here, an example of an electromagnetic driving type is discussed as a part configured to apply a rotational torque to a movable mirror.

The vibrating mirror module includes a vibrating mirror board 440, a movable mirror 441, a torsion beam 442, a supporting member 430, a mounting board 448, a circuit board 445, a position determining part 451, an edge connecting unit 452, a retaining claw 453, a connector 454, and wiring terminals 455.

The movable mirror 441 having a two-step structure is axially supported by the torsion beam 442. The vibrating mirror board 440 is prepared, as discussed below, by etching a single Si board to punch the outside shape out, and is mounted on the mounting board 448.

The supporting member 430 is formed of resin by molding, and is positioned in a predetermined location of the circuit board 445. The supporting member 430 is integrally formed with the position determining part 451 and the edge connecting unit 452.

The position determining part 451 determines the position of the vibrating mirror board 440 so that the reflective surface of the movable mirror is parallel to the main scanning plane surface and tilted at a predetermined angle, or 60 degrees in this example, from the main scanning direction.

The edge connecting unit 452 includes a set of metal terminals aligned to connect the wiring terminals 455 formed on one edge of the mounting board 448 of the vibration mirror board when mounted.

Thus, one side of the vibrating mirror board 440 is inserted into the edge connecting unit 452 and fitted inside the retaining claw 453. The back of the vibrating mirror board 440 is supported with both side surfaces aligned along the position determining part 451, and the electric wiring is completed.

With such a structure, each vibrating mirror board 440 can be individually replaced.

Furthermore, a control IC, a crystal oscillator and the like that drive the vibrating mirror are mounted on the circuit board 445, to which power is externally supplied via the connector 454.

Figure 3:
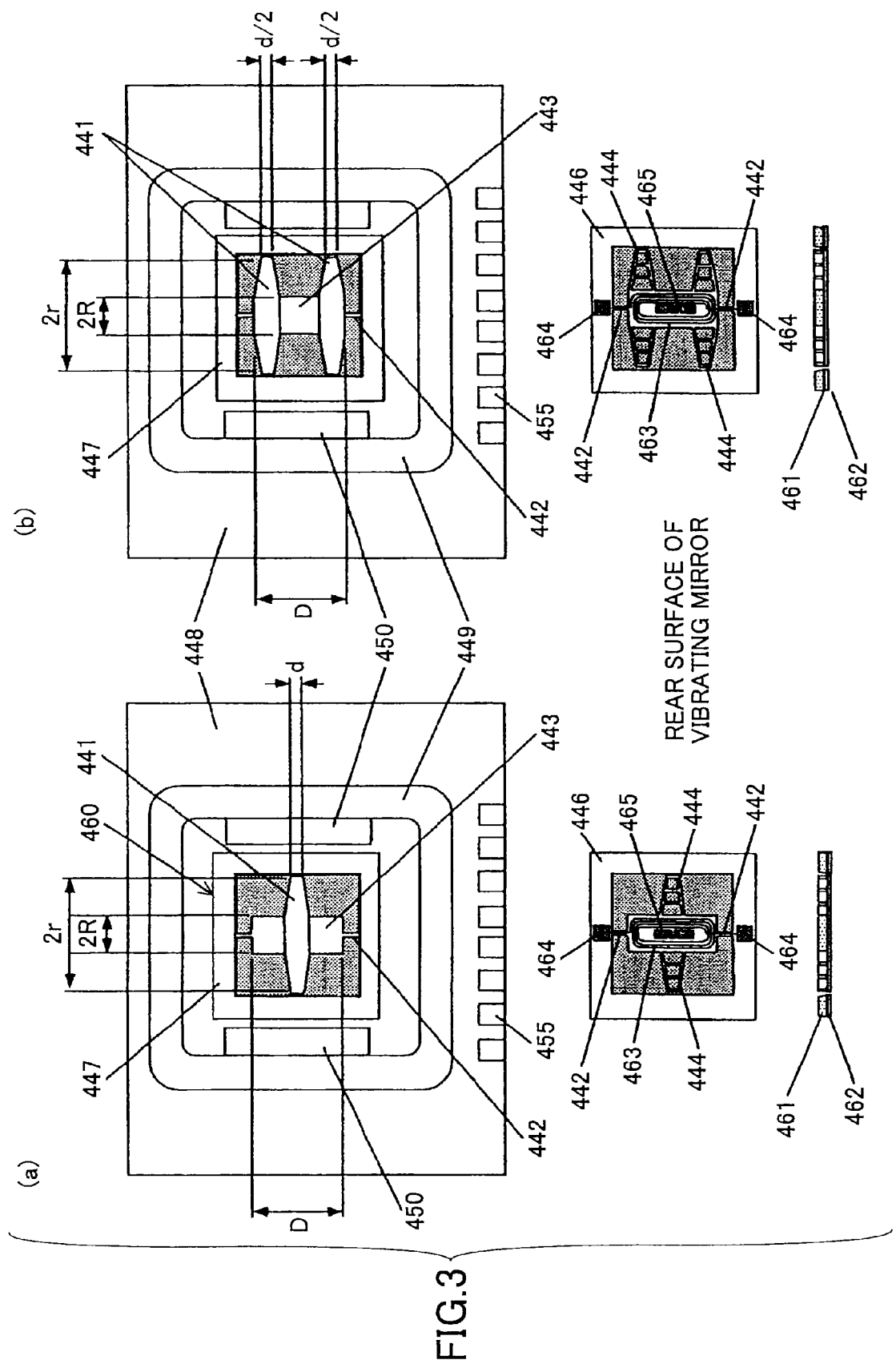
FIG. 3 is a front view and a rear view of the deflector of the embodiment of the present invention.
Figure 4:
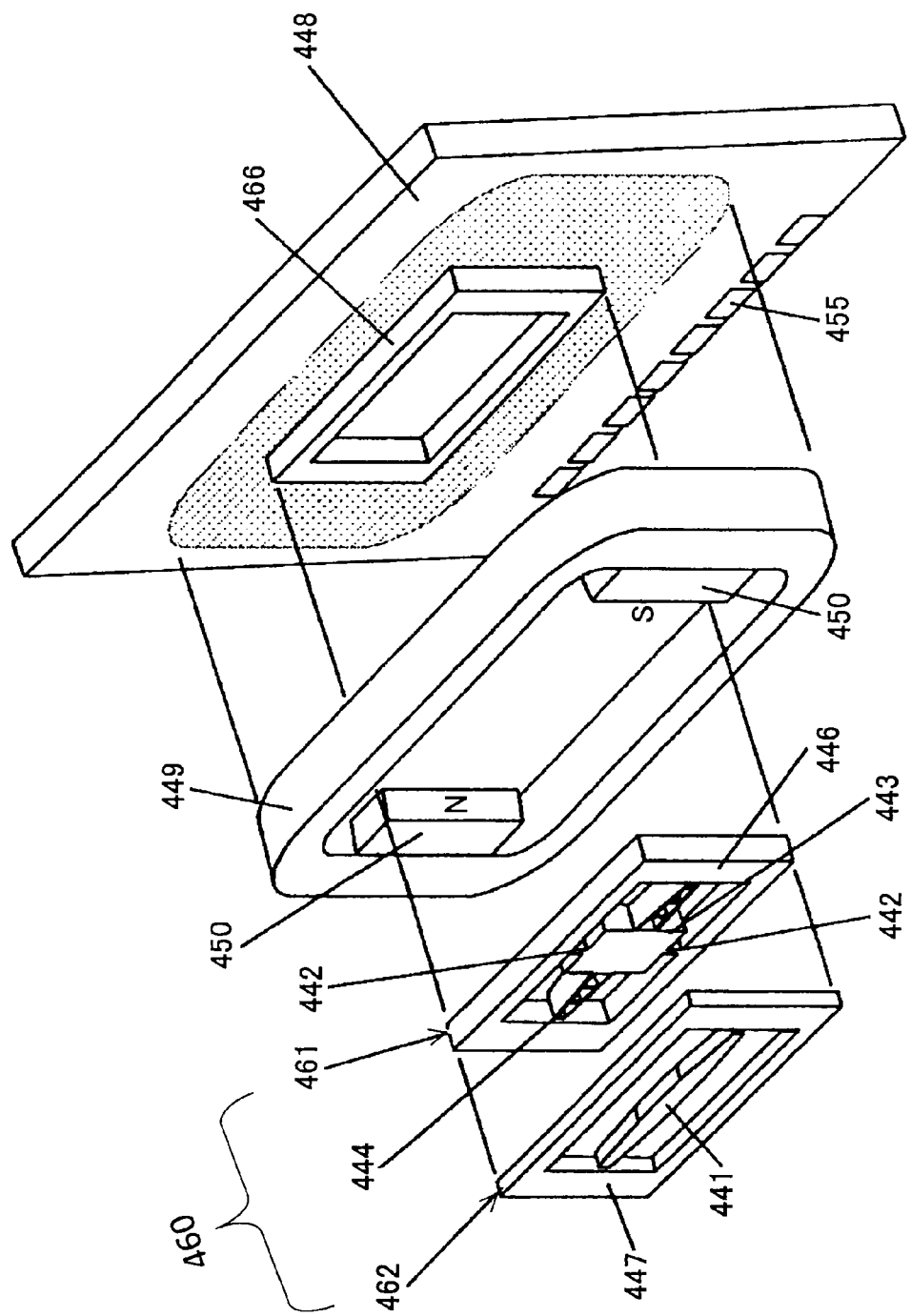
FIG. 4 is an exploded perspective view of the deflector of the embodiment of the present invention.

FIG. 3 is a front view and a rear view of the vibrating mirror board 440 of the embodiment of the present invention. More specifically, FIG. 3(*a*) shows a single-step mirror and FIG. 3(*a*) shows a two-step mirror. FIG. 4 is an exploded perspective view of the single-step mirror.

The vibrating mirror board 440 includes the vibrating mirror 460 the mounting board 448, the yoke 449, the permanent magnets 450, and the wiring terminals 455.

The vibrating mirror 460 includes a first board 462 and a second board 461. The first board 462 includes the movable minor 441 and the first frame 447.

The second board 461 includes the torsion beam 442, the vibrating plate 443, the reinforcing beam 444, the second frame 446, the surface coil 463, the terminals 464, and a trimming patch 465.

The vibrating mirror 460 is prepared by etching a Si wafer so that the movable mirror is formed. According to this embodiment, a wafer is used in which two SOI boards, one having a thickness of 60 μm and the other having a thickness of 140 μm, sandwich an oxide film and are attached together.

First, the wafer is pierced from the top surface of the 140 μm thick second board 461 to the oxide film in portions other than the torsion beam 442, the vibrating plate 443 on which a flat coil is formed, the reinforcing beam 444 which works as frameworks of the movable mirror 441, and the second frame 446 by a dry process using plasma etching.

Next, the wafer is pierced from the top surface of the 60 μm thick first board 462 to the oxide film in portions other than the movable mirror 441 and the first frame 447 by anisotropic-etching the 60 μm-thick board 462 by use of KOH, for example.

Finally, the oxide film around the movable mirror 441 is removed, and the wafer is cut into vibrating mirrors 460.

The torsion beam 442 and the reinforcing beam 444 have width of approximately 40 μm to 60 μm.

Furthermore, reflective surfaces are formed on the top surface of the first board 462, with a metal thin film such as an aluminum thin film. The trimming patch 465, the terminal 464 that is wired via the surface coil 463 and the torsion beam 442 that is a copper thin film are formed on the top surface of the second board 461.

The frame-shaped base 466 for fitting the vibration mirror 460 in and the yoke 449 formed to surround the vibration mirror 460 are provided on the mounting board 448. A pair of permanent magnets 450 are attached to the yoke 449 and arranged to face one side of the movable mirror in such a manner that the south pole of one magnet and the north pole of the other oppose each other, thereby generating magnetic fields in a direction perpendicular to the rotational axis.

The vibration mirror 460 is mounted on the base 466 where a movable surface is exposed. Lorentz force is generated on the sides of the surface coil 463 parallel to the rotational axis when the current flows between the terminals 464.

As a result, a torque T is generated, twisting the torsion beam 442 to rotate the movable mirror 441. When the current is turned off, the movable mirror 441 is returned to the neutral position by a spring force of the torsion beam 442.

Thus, the movable mirror 441 can be reciprocally vibrated by switching back and forth the direction of the current that flows through the surface coil 463.

In addition, by bringing the cycle of switching this current closer to the characteristic frequency in the primary vibration mode where the structural body of the movable mirror 441 vibrates with the torsion beam 442 as a rotational axis, i.e. resonance frequency f0, the amplitude of the vibration increases, resulting in a greater scan angle.

For this reason, the scanning frequency fd is usually set to this resonance frequency f0.

However, as discussed above, the resonance frequency f0 is determined by the inertia moment I of the movable mirror 441, and fluctuations in finished dimensions cause differences among units so that the scanning frequencies fd do not coincide with each other.

The fluctuations in the resonance frequencies f0 is in a range of ±200 Hz, although it depends on the processing capabilities. For instance, when the scanning frequency fd=2 kHz, a misalignment equivalent to 1/10 line may occur in scanning line pitch. When 10 lines are recorded, the misalignment may become equivalent to 1 line.

Because of this, in this embodiment, as post treatment, the patch 465 formed on the rear side of the movable mirror 441 is cut by a carbon dioxide laser or the like so that the mass of the vibrating part is gradually reduced. As a result of this, even if measurement differences exist, the resonance frequency f0 is substantially consistent among the movable mirrors 441, dispersion is adjusted so as to be within ±50 Hz, and the scanning frequency fd is set in the frequency band at other than the resonance frequency f0.

Figure 5:
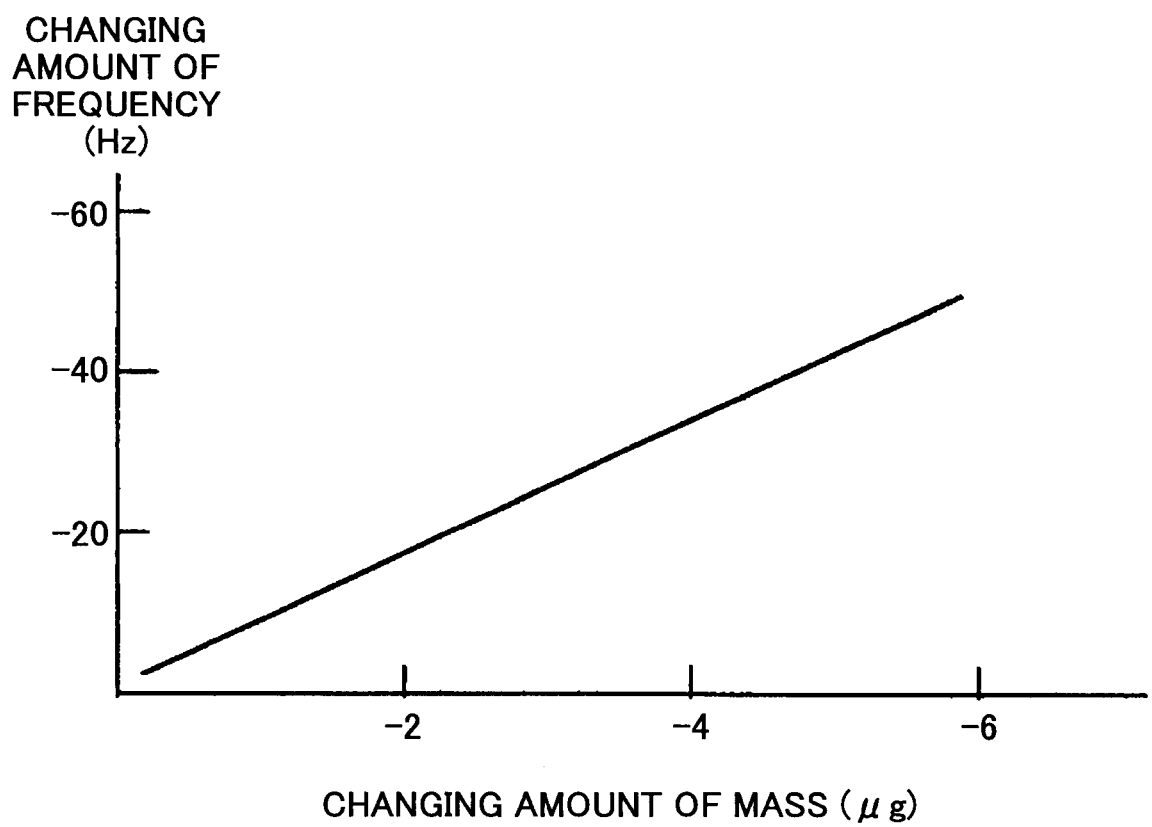
FIG. 5 is a graph showing change of resonance frequency f0 due to change of the mass of a vibrating part.
Figure 6:
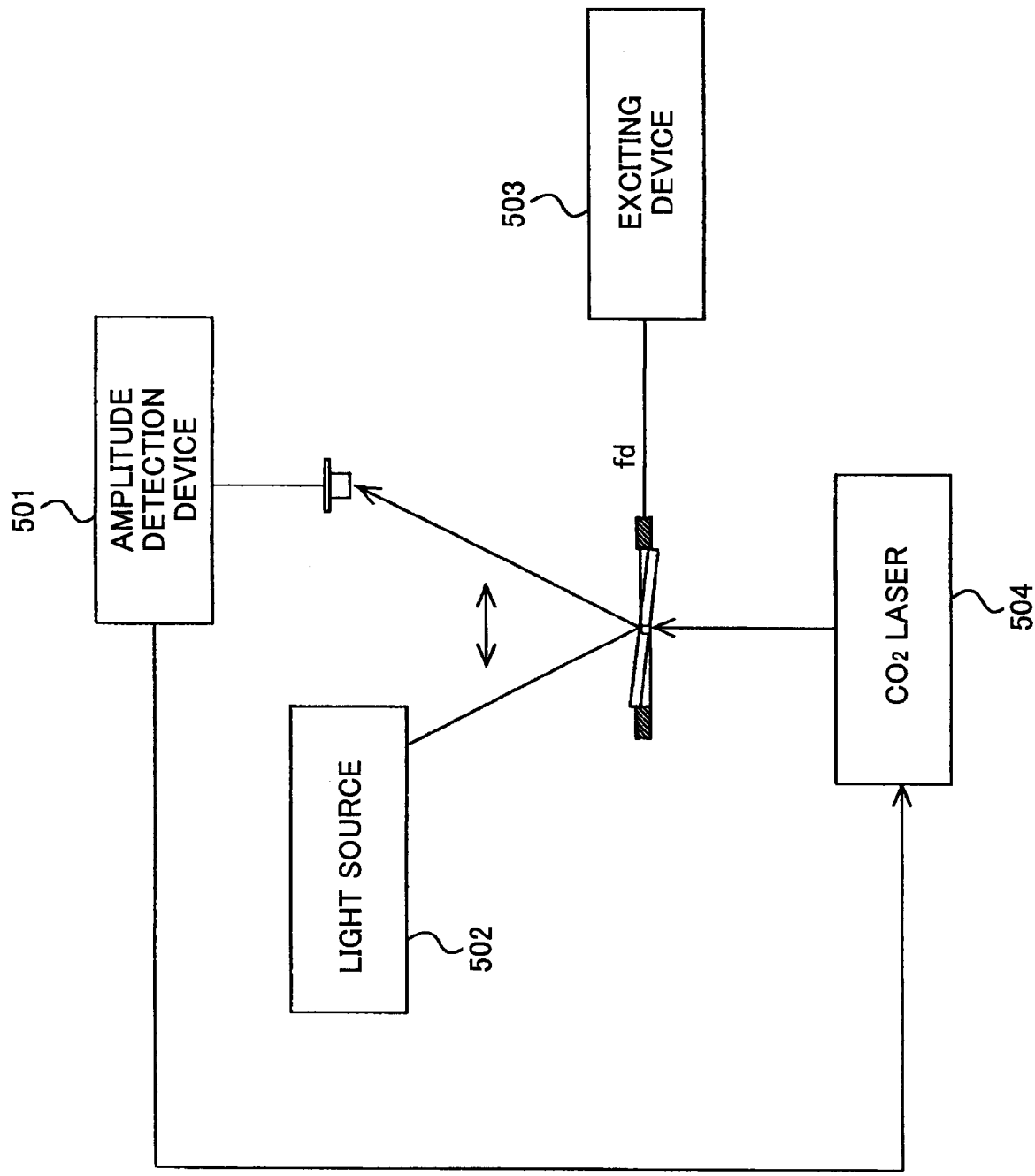
FIG. 6 is a schematic view showing adjustment of the resonance frequency due to the change of the mass of the vibrating part.

FIG. 5 is a graph showing change of resonance frequency f0 due to change (trimming) of the mass of the vibrating part. FIG. 6 is a schematic view showing adjustment of the resonance frequency f0 due to the change (trimming) of the mass of the vibrating part.

Before being mounted on the mounting board 448, the vibrating mirror 460 is vibrated corresponding to the scanning frequency by an exciting device 503. A CO2 laser 504 is irradiated on the patch 465 from the rear side of the movable mirror 441 so that cutting is performed until the scan angle is immediately increased due to resonance.

The resonance frequency is obtained by changing the scanning frequency by the exciting device 503 in order that the mass corresponding to shifted amount may be added or deleted.

By arranging the patch 465 in the vicinity of the rotational axis, the patch 465 does not greatly affect the inertia moment so that trimming treatment is made in an excited state. In addition, resonance is detected by irradiating the beam to the surface of the movable mirror from the light source device 502 so that deflection of the reflection beam is detected.

In the meantime the movable mirror has the relationship as shown in FIG. 3:

$$D \geq d \cdot (r/R)^2$$

where width in a direction perpendicular to a rotational axis of the mirror effective diameter is 2r; width in a direction parallel with the rotational axis of the mirror effective diameter is d; width in a direction perpendicular to a rotational axis of the vibrating plate is 2R; and width in a direction parallel with the rotational axis of the vibrating plate is D.

More specifically, since 2r equals 4.5 and d equals 1 in cases of both (1) single-step mirror and (2) two-step mirror, when the width 2R of the vibrating plate equals 3, the width D of the vibrating plate in the case of the single-step mirror is equal to or greater than 2.25, and the width D of the vibrating plate in the case of the two-step mirror is equal to or greater than 4.5.

As discussed above, the relationship of the scan angle θ of the movable mirror and the measurements of the vibrating plate is expressed by $$\theta = \kappa / I \cdot f0^2, \text{where } \kappa \text{ is a constant.} \quad (1)$$

In addition, the relationship of the scan angle θ of the movable mirror and the rotational torque T is expressed by $$\theta = \kappa' \cdot T/K \text{ where } \kappa' \text{ is a constant.} \quad (2)$$

In the above-mentioned equation, a first term is related to the mass M. Therefore, in this embodiment, even if the width 2r in a direction perpendicular to the rotational axis is made large, since the width in the perpendicular direction is made minimum and a part outside R from the rotational axis is of light weight due to a hollow structure so that the increase of the mass M is made minimum, the scan angle θ is inversely proportional to square of r. The rotational torque T is given in order to supply this amount. Therefore, in order to secure the rotational torque T corresponding to this, the width D of the vibrating plate 443 is set and the length of the surface coil along the direction parallel with the rotational axis is set.

While the first board 462 including the movable mirror and the second board 461 including the torsion beam are provided in this embodiment and are made of two pieces of Si substrate for selecting proper thickness in this embodiment, the present invention is not limited to this example. These may be made of a single substrate.

In addition, while the surface coil is provided at the vibrating plate 443 and a pair of the permanent magnets 450 is connected to the yoke 449 in this embodiment, the present invention is not limited to this example. The permanent magnet 450 may be provided at the vibrating plate 443 and the surface coil 463 be provided at the first frame 447 or the second frame 446 or the yoke 449.

Furthermore, while the surface coil is provided on a surface in this embodiment, the coil is not limited to being on a surface. This is applied to not only this embodiment but also other embodiments discussed below.

Figure 7:
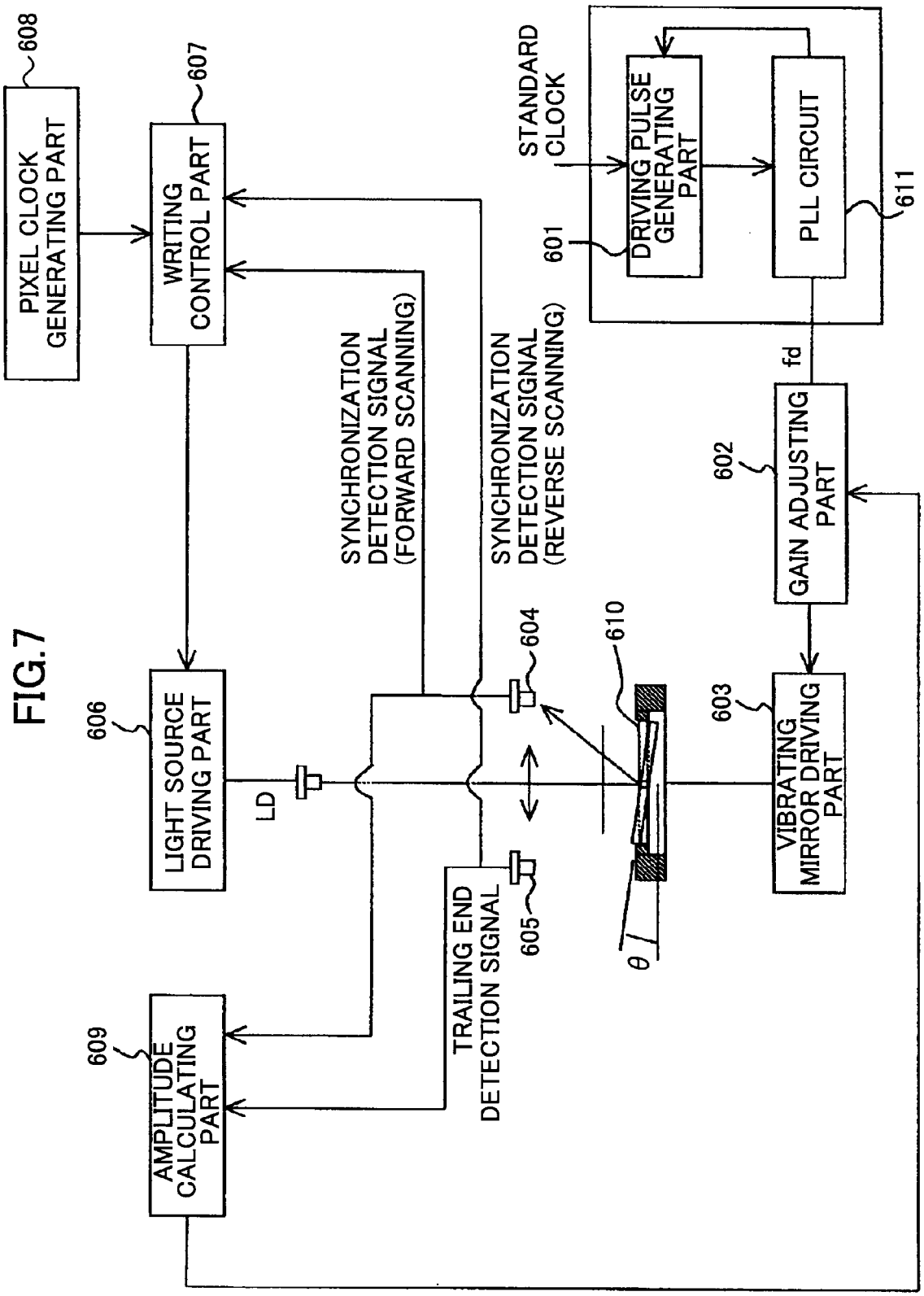
FIG. 7 is a block diagram of a driving circuit configured to vibrate a vibrating mirror of the embodiment of the present invention.

FIG. 7 is a block diagram of a driving circuit configured to vibrate a vibrating mirror of the embodiment of the present invention. The driving circuit includes a driving pulse generating part 601, a gain adjusting part 602, a movable mirror driving part 603, a synchronization detection sensor 604, a trailing end detection sensor 605, a light source driving part 606, a write controlling part 607, a pixel clock generating part 608, an amplitude calculating part 609, a movable mirror 610, and a PLL circuit 611.

In the driving pulse generating part 601, the standard clock is divided by, for example, a programmable divider and a pulse line where the voltage pulse is applied at a timing corresponding to amplitude of the movable mirror 610 is generated.

In addition, the pulse line is made have a designated phase delay for each of the deflection mirror modules via the PLL circuit 611 and is given to the driving part 603 of each of the movable mirrors via the gain adjustment part 602, so that the voltage is applied each of the electrodes.

An AC voltage or a pulse wave voltage is applied to the surface coil set at the rear side of the vibrating plate adjacent to the movable mirror so that the directions of the electric current flow are switched. The gain of the electric current flowing in the surface coil is adjusted so that the scan angle θ is constant and reciprocal vibration is made.

While the synchronization detection sensor 604 and the trailing end detection sensor 605 are provided on the substrate, the detected surface is arranged in a position in the same as the optical path reaching the scanned surface. The writing control part 607 receives the image data or changeable data from the pixel clock generation part 608 and sends the data to the light source driving part 606.

The driving voltage is not basically applied to the movable mirror 610 other than image recording and its preparation period. The beam from the light source driving part 606 is detected by the synchronization detection sensor 604 and the trailing end detection sensor 605. Time difference between the synchronization detection signal and the trailing end detection signal is measured by the amplitude calculating part 609 so that the scan angle of the movable mirror 601 is detected.

Figure 8:
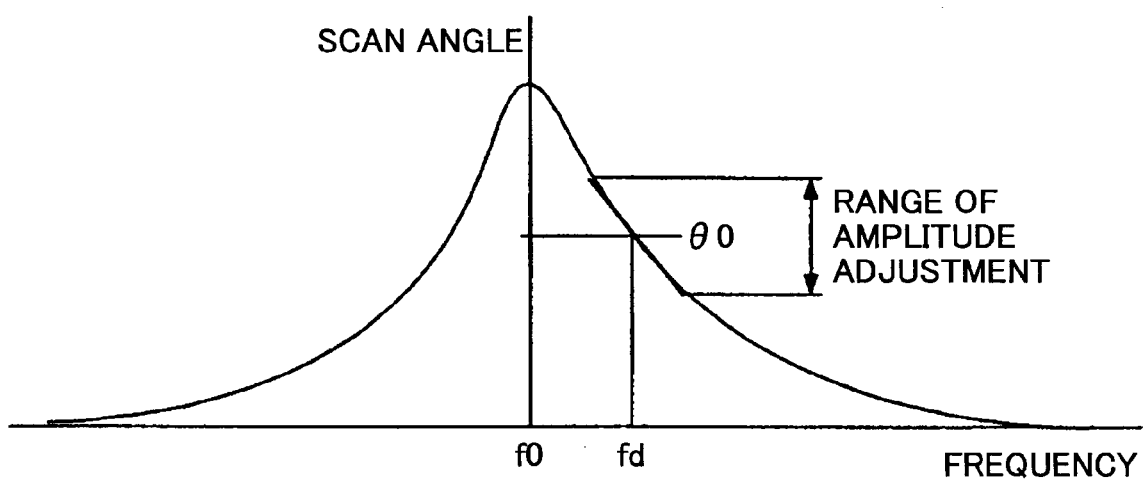
FIG. 8 is a graph showing the relationship between a frequency f at which the direction of electric current is switched and a scan angle θ.

FIG. 8 is a graph showing the relationship between a frequency f whereby a direction of an electric current is switched and a scan angle θ.

In general, the frequency f has a characteristic where the resonance frequency f0 forms its peak. This means that the largest scan angle can be obtained by matching the scanning frequency fd with the resonance frequency f0. However, the scan angle sharply changes in the vicinity of the resonance frequency.

Therefore, although it is possible to set the driving frequency applied to the fixed electrode of the drive controlling unit of the movable mirror in the initial stage to mach the resonance frequency, the scan angle rapidly decreases if the resonance frequency varies owing to a change in a spring constant in accordance with a change in temperature. This raises a problem of lacking stability over time.

In conventional technologies, an example of adjusting the scanning frequency fd in accordance with changes in the resonance frequency f0. However, as discussed above, a change in the scanning frequency fd leads to misalignment of a pitch of the scanning line.

According to this embodiment, the scanning frequency fd is fixed to a single frequency other than the resonance frequency f0, and the scan angle θ is increased or decreased in accordance with the gain adjustment.

More specifically, the scanning frequency fd is set to 2.5 kHz while the resonance frequency f0 is 2 kHz. The scan angle θ is controlled to be ±25 degrees by adjusting the gain.

As the process proceeds, the scan angle θ is controlled to be constant by calculating the scan angle θ from the scanning time of the beam moved by the movable mirror between the synchronization detection sensors 604 provided at the leading end and trailing end of the scanning region and the trailing end detection sensor 605.

It should be noted that the scan angle θ of the vibration mirror, which vibrates in resonance, varies in a sine wave form. On the other hand, dots have to be printed at regular intervals in the main scanning direction on a photosensitive drum surface, which is a surface to be scanned.

If the pixel clock is modulated with a single frequency, dot intervals become larger on the scanned surface as the amplitude reaches its peak.

Such displacements in linearity are corrected with a f·arc sin lens, as discussed above. However, an effective half field angle ω, or an effective scan angle θd for scanning image areas, is equal to or less than 50% of the entire scan angle θ.

Because of this, in this embodiment, by electrical correction for supporting, an effective scanning ratio, namely a ratio between the effective scan angle θd and all scan angle θ, is set to exceed 50%.

More specifically, the phase of each pixel is changed in accordance with a position in the main scanning direction, from a state of being ahead at the write leading end to a state of being delayed at the write trailing end.

Figure 9:
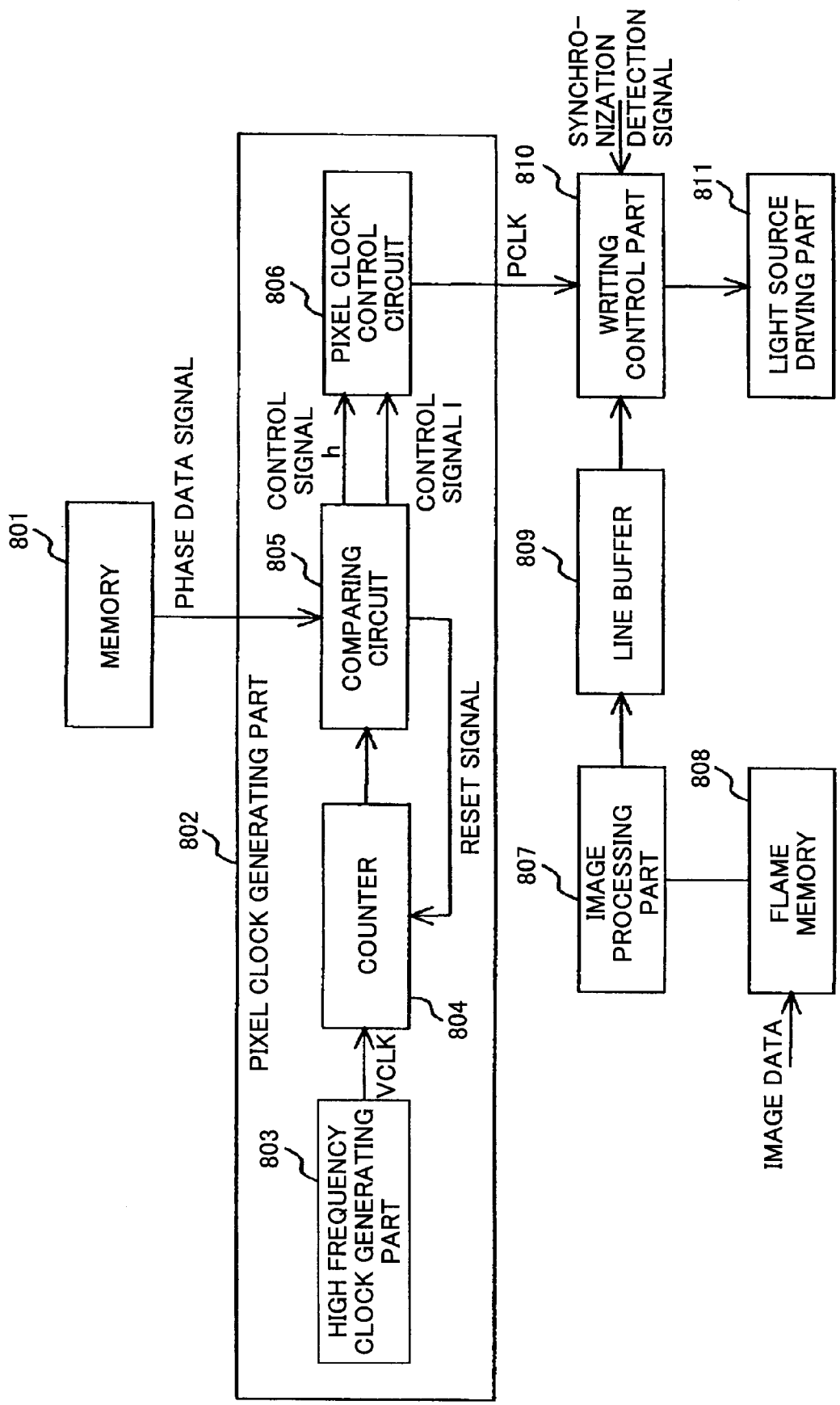
FIG. 9 is a block diagram of a driving circuit configured to modulate a semiconductor laser of the embodiment of the present invention.

FIG. 9 is a block diagram of a driving circuit configured to modulate a semiconductor laser as a light emitting source of the embodiment of the present invention.

The driving circuit includes a memory 801, a pixel clock generation part 802, a high frequency clock generation part 803, a counter 804, a comparing circuit 805, a pixel clock control circuit 806, an image processing part 807, a frame memory 808, a line buffer 809, a writing control part 810, and a light source driving part 811.

First, the memory 801 sends a phase data signal to the comparing circuit 805 in the pixel clock generation part 802.

The pixel clock generation part 802 includes the high frequency clock generation part 803, the counter 804, the comparing circuit 805, and the pixel clock control circuit 806. The high frequency clock generation part 803 generates a high frequency clock VCLK. The counter 804 counts high-frequency clocks VCLK generated by a high-frequency clock generating circuit 803.

The comparing circuit 805 compares this count value, a preset value L predetermined based on the duty ratio, and phase data H that is externally provided as a transition timing of the pixel clock and indicates a phase shift amount. When the count value matches the preset value L, the comparing circuit 805 outputs a control signal 1 indicating the falling edge of the pixel clock PCLK. When the count value matches the phase data H, the comparing circuit 805 outputs a control signal h indicating the rising edge of the pixel clock PCLK.

A sequential pulse train is attained by resetting the counter 804 at the time of outputting the control signal h so that the counter 804 starts counting from 0 again.

Thus, pixel clocks PCLK whose pulse cycles are changed are sequentially generated by providing phase data H for every clock.

According to this embodiment, a pixel clock PLCK has a one-eighth cycle of the high-frequency clock VCLK so that the phase can vary with resolution equivalent to one-eighth of a clock.

The pixel clock control circuit 806 generates the pixel clock PCLK from the control signal h and the control signal 1 received from the comparison circuit 805 so as to send the pixel clock PCLK to the writing control part 810.

The image data that are raster-developed for each color are stored in the flash memory 808 for a while and read by the image processing part. The pixel data of each of lines is formed corresponding to a matrix pattern corresponding to a half-tone and with reference to front and back relation and is forwarded to the line buffer corresponding to each of the light emitting sources. The writing control circuit 810 reads all the pixel data from the line buffer 809 and individually modulates data elements by using a synchronizing detection signal as a trigger so as to send the data elements to the light source driving part 811.

Figure 10:
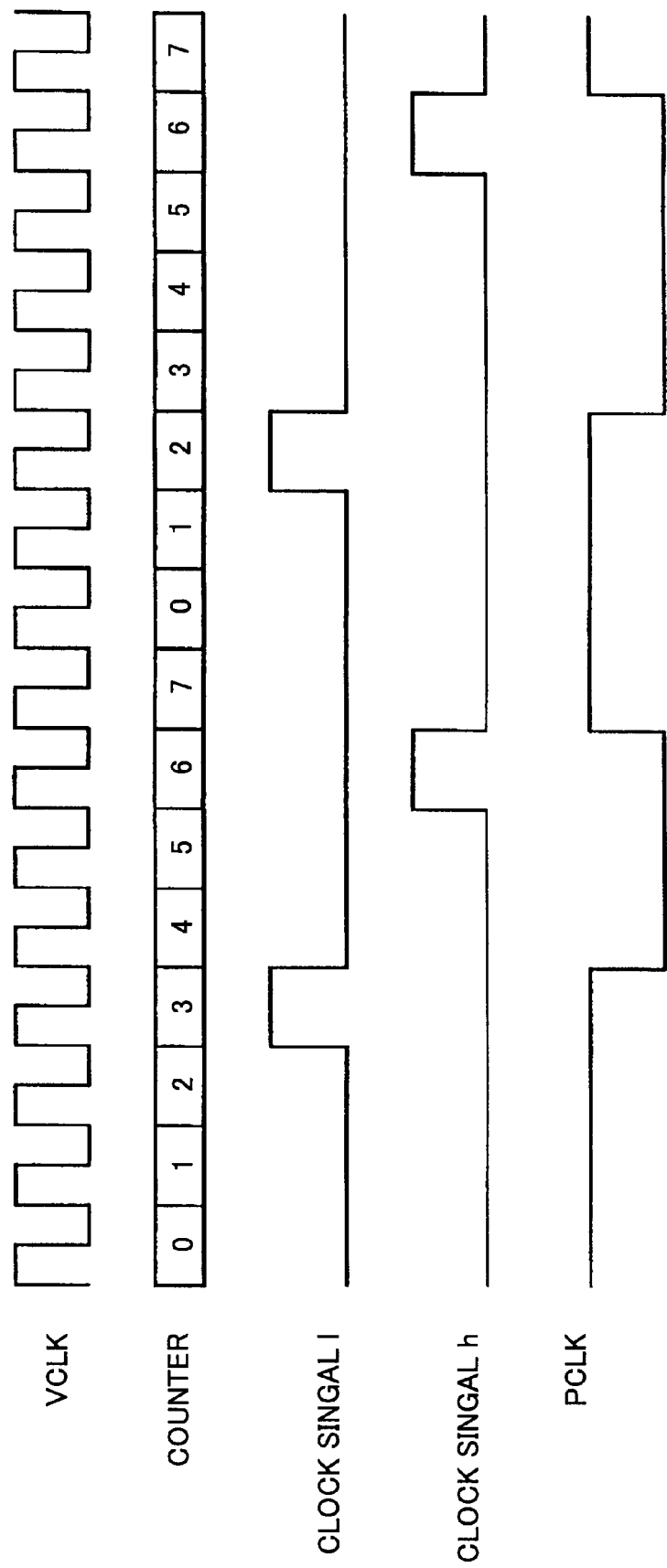
FIG. 10 is a view for explaining a case where a phase of an arbitrary pixel is shifted and the phase is delayed by ⅛ clock.

FIG. 10 is a view for explaining a case where a phase of an arbitrary pixel is shifted. In this drawing, an example in which the phase is delayed by one-eighth of a clock is given.

When the duty ratio is 50%, the preset value L=3 is provided. After the counter 804 counts 4 (four), the pixel clock PCLK falls. If the phase is to be delayed by one-eighth of a clock, the phase data H=6 is provided, and the pixel clock PCLK rises after 7 (seven) counts. The counter is reset at this time, and the pixel clock PCLK falls again after 4 (four) counts. Hence, the adjacent pulse cycle is reduced by one-eighth of a clock.

The pixel clock PCLK thus generated is supplied to the light source driving unit 811. The semiconductor laser is driven by modulated data prepared by superposing pixel data read from the line buffer 809 onto the pixel clock PCLK.

Figure 11:
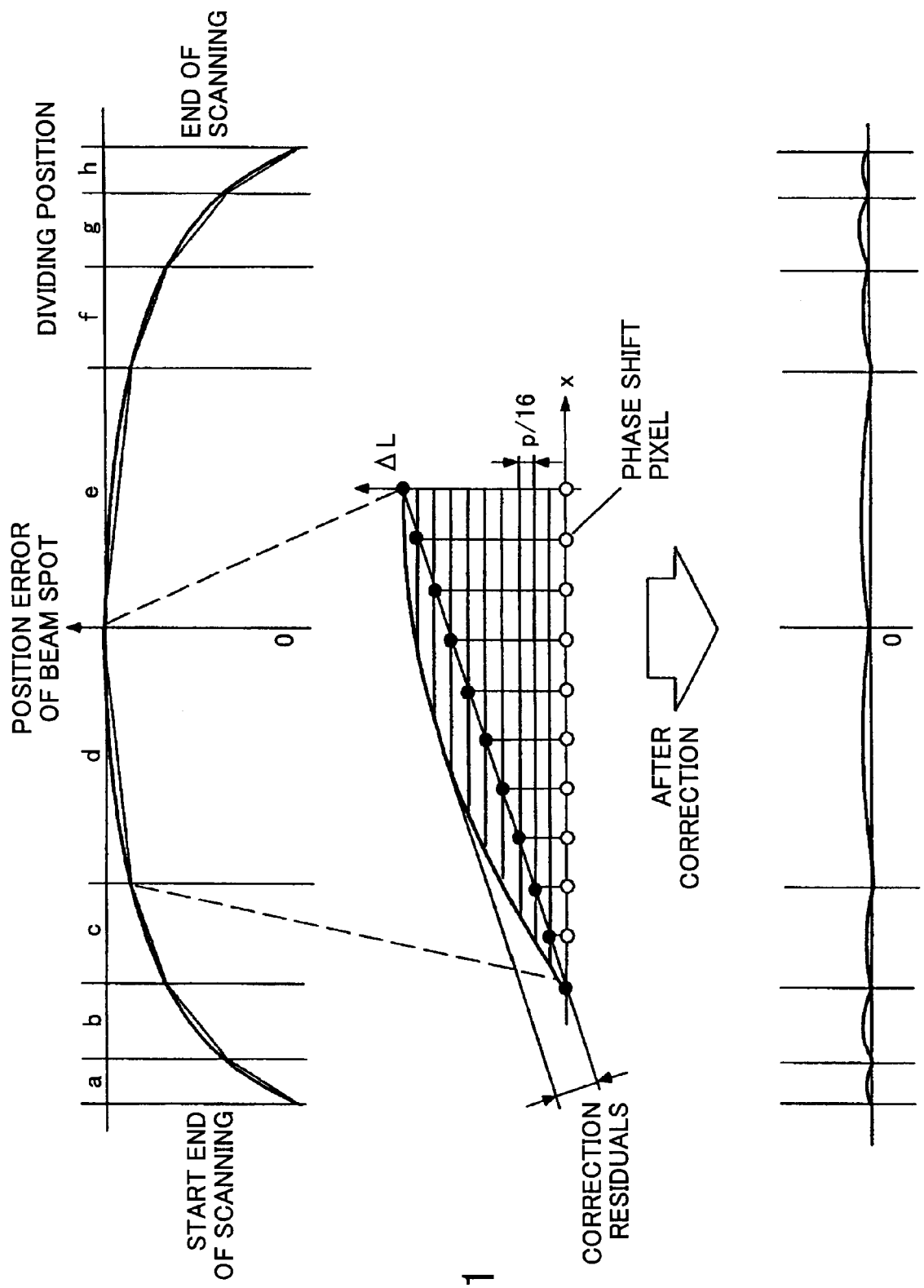
FIG. 11 is a view for explaining pixel misalignment corresponding to a main scanning position when modulation is with a single frequency.

FIG. 11 is a view for explaining pixel misalignment of each of the pixels corresponding to a main scanning position when modulation is made with a single frequency;

The main-scanning region is divided into several areas, and the pixel interval n by which the phase for each area is shifted so that there will be no misalignment at the divided positions. According to the second embodiment, the main-scanning region is divided into eight areas in such a manner that areas located nearer to either end of the scanning have smaller widths.

For instance, when each area has the number N of pixels, the phase shift amount for each pixel is one-sixteenth of a pixel pitch p, which is every one-eighth of a clock, and the misalignment amount at both ends of each area is ΔL, n=N·p/16ΔL.

Thus, the phase should be shifted every n pixels.

Second Embodiment of the Present Invention

Next, an optical scanning unit of an embodiment of the present invention is discussed.

Figure 12:
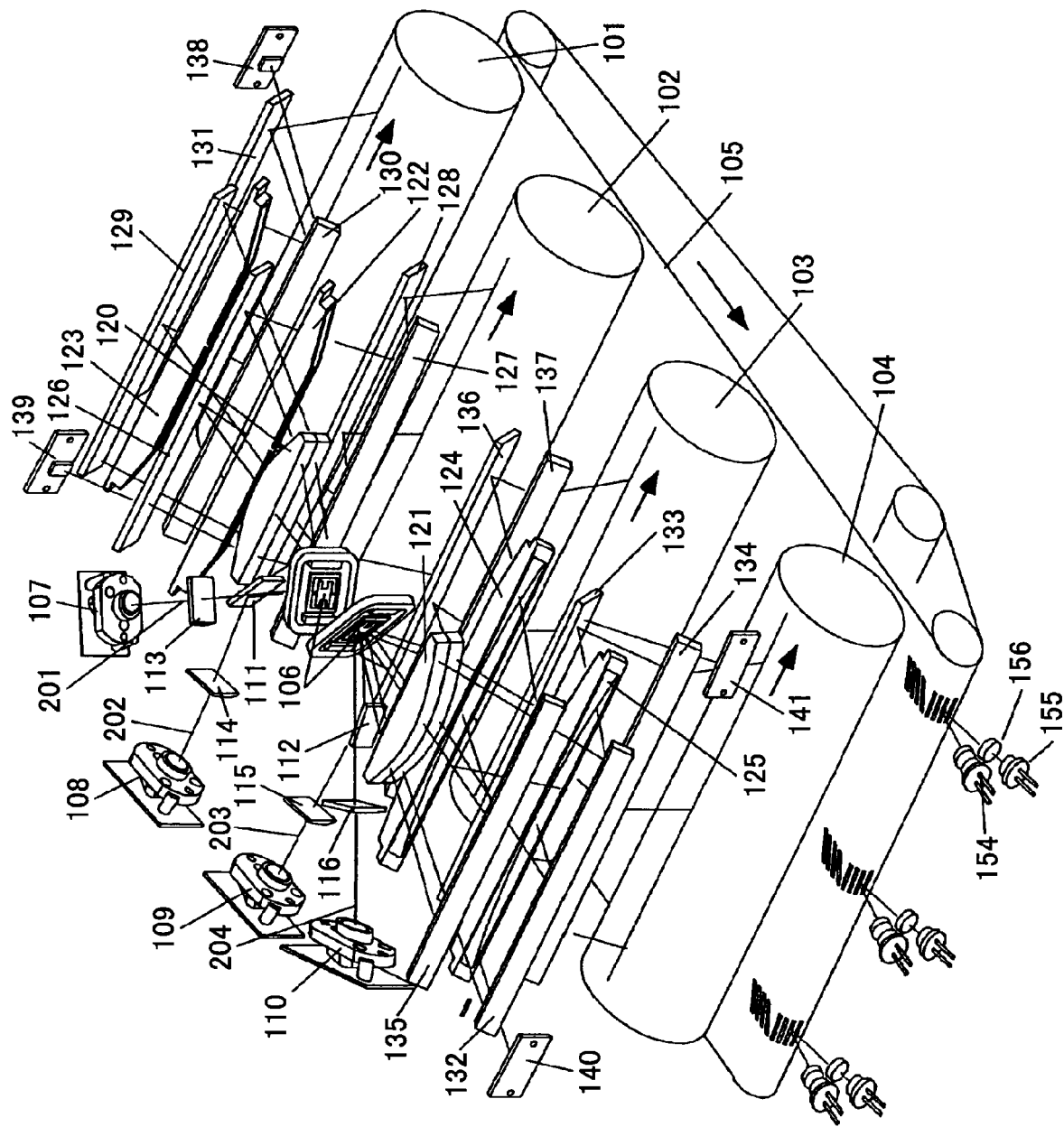
FIG. 12 is a first schematic view of an optical scanning unit of the embodiment of the present invention.

FIG. 12 is a first schematic view of the optical scanning unit of the embodiment of the present invention. More specifically, FIG. 12 shows an example of the optical scanning unit where four stations are scanned. This example is a facing scanning grazing incidence optical system where four stations are arranged by every two stations and the beam is incident on a pair of the vibrating mirrors which mirrors are arranged in opposite directions so for deflection and scanning.

Four photosensitive drums 101, 102, 103, and 104 are arranged at regular intervals in a direction of movement of a transfer belt 105. A color image is formed by sequentially transferring and superposing toner images of different colors formed on the photosensitive drums 101, 102, 103, and 104.

The optical scanning unit configured to scan each of the photosensitive drums is composed in a body and scans beams from the corresponding light source units by the movable mirrors provided individually.

The vibrating mirror module is provided in the center part of the optical scanning unit. The vibrating mirror module includes a pair of the vibrating mirrors having a two-step movable mirror 106 with mirror surfaces connected to each other with a designated gap in a sub-scanning direction, the gap being approximately 4 mm of the mirror center distance in this example. The mirror surfaces form an angle of approximately 60 degrees. The beam from each of the light source units 107-110 is incident moving toward the rotational axis of the vibrating mirror from outside the scanning area.

The light source units 107 and 109 are arranged so as to be lower according to a gap between upper and lower mirror surfaces of the movable mirror, than the light source units 108 and 110. Furthermore, the light source units 107, 108, 109, and 110 are arranged at symmetric positions with respect to the vibration mirror module in such a manner that the deflection direction of the beams 201 and 202 projected from the light source units 107 and 108, respectively, will be opposite to the deflection direction of the beams 203 and 204 projected from the light source units 109 and 110, respectively.

Scanning lenses 120 and 121, and toroidal lenses 122, 123, 124, and 125 arranged for corresponding beams cause the beams deflected by the vibration mirrors 106 to form images in spot form on a corresponding photosensitive drums of magenta, yellow, black, or cyan, and write the image at the same time.

The light beams 202 and 203 from the light source units 108 and 109, respectively, are bent by the incident mirrors 111 and 112. The main scanning directions of the light beams 202 and 203 are consistent with the light paths of the light beams 201 and 204 from the light source units 107 and 110 directly toward the movable mirrors 106.

As a result of this, incident angles of the beams 201, 202, 203, and 204 from the corresponding light source units form angles of approximately 30 degrees in a main scanning direction with normal lines of the movable mirrors 106.

While grazing incidence with a designated angle in a sub-scanning direction is made in this embodiment, it is possible to make incidence on a front surface of the movable mirrors 106.

The cylinder lenses 113, 114, 115, and 116 each have a planar surface on one side and a curved surface on the other side having a common curvature with respect to the sub-scanning direction. The cylinder lenses 113, 114, 115, and 116 are positioned so that the optical paths have the same length up to the deflection point of the reflective surfaces.

All the beams are converged to be linear in the main scanning direction in the vicinity of the deflection surface. An optical face tangle error correction system is constituted by the cylinder lenses 113, 114, 115, and 116 and the toroidal lenses 122, 123, 124, and 125 that are discussed below, bringing the deflection point and the photosensitive surface into a conjugate relationship with respect to the sub-scanning direction.

The fθ lenses 120 and 121 are prepared by integrally forming a double-layered structure or combining two layers together so as to be shifted for a distance corresponding to the vertical distance of the movable mirror 106.

Furthermore, the fθ lenses 120 and 121 have a non-arc surface and are provided with power in the main scanning direction so as to have f·arc sine characteristics in response to the sin wave vibration of the vibration mirror, or in other words, characteristics where a scanning distance per unit scan angle dH/dθ is proportional to sin−1θ/θ0.

Thus, the beams can travel on the photosensitive surface at substantially constant speed, in accordance with the vibration of the vibration mirror. The fθ lenses 120 and 121 together with the toroidal lenses 122, 123, 124, and 125 focus image-forming beams on the surfaces of the photosensitive bodies in a spot state so that the latent images are recorded.

In this embodiment, the vibrating mirror of each of the color stations is provided so that a rotational axis is consistent with an image center in a main scanning direction. Three reflection mirrors are provided for every station so that each optical path length from the vibrating mirror to the photosensitive body surface is the same and an incident position and an incident angle to each of the photosensitive drums provided with equal intervals is the same.

The optical path for each station is explained.

The beam 201 emitted from a light source unit 107 passes through the cylinder lens 113 and is deflected by the upper step of the movable mirror 106. Then, the beam 201 passes through the upper layer of the fθ lens 120, is reflected by the reflection mirror 126, passes through the toroidal lens 122, is reflected by the reflection mirrors 127 and 128 to be guided to the photosensitive drum 102, which is the second station, where a latent image is formed based on the image information for magenta.

The beam 202 emitted from the light source unit 108 passes through the cylinder lens 114, is reflected by the incident mirror 111 and deflected by the lower step of the movable mirror 106. Then, the beam 202 passes through the lower layer of the f θ lens 120, is reflected by the reflection mirror 129, passes through the toroidal lens 123, and is reflected by the reflection mirrors 130 and 131 to be guided to the photosensitive drum 101, which is the first station, where a latent image is formed based on the image information for yellow.

A similar process is conducted for the stations arranged symmetrically with respect to the vibration mirror 106. The beam 203 from the light source unit 109 is deflected, via the incident mirror 112, by the lower step of the movable mirror 106, passes through the lower layer of the fθ lens 121, and is reflected by the reflection mirrors 132, 133, and 134 to be guided to the photosensitive drum 104, which is the fourth station, where a latent image is formed based on the image information for black.

In addition, the beam 204 from the light source unit 110 is deflected by the upper step of the movable mirror 106, passes through the upper layer of the fθ lens 121, and is reflected by the reflection mirrors 135, 136, and 137 to be guided to the photosensitive drum 103, which is the third station, where a latent image is formed based on the image information for cyan.

All the components are integrally retained in a single housing that is not shown.

In FIG. 12, reference numerals 138, 139, 140, and 141 each designate a board for mounting a synchronization detection sensor and an end detection sensor. A set of two sensors is provided for a pair of stations that face each other to detect a beam in front and back of a scanning region.

A synchronization detection signal is generated based on detection signals from the synchronization detection sensors 139 and 141 in forward scanning. In reverse scanning, a synchronization detection signal is generated based on detection signals from the end detection sensors 138 and 140. The timing of starting writing is thereby determined.

A detection part is provided at an exit roller part of the transferring belt 105 so as to detect superposing precision of each of color images formed by the corresponding stations. The detection part reads the detection pattern of the toner image formed on the transferring belt 105 so as to detect the main scanning resist and the sub-scanning resist as a gap from the station and make corrections periodically.

In this embodiment, the detection part includes an LED element 154 for lighting, a photo sensor 155 configured to receive reflection light and a pair of condensing lenses 156. The detection parts are provided at left and right ends and the center of the image. The detection part reads the difference of detection time from black as a standard color corresponding to movement of the transferring belt.

Third Embodiment of the Present Invention

Figure 13:
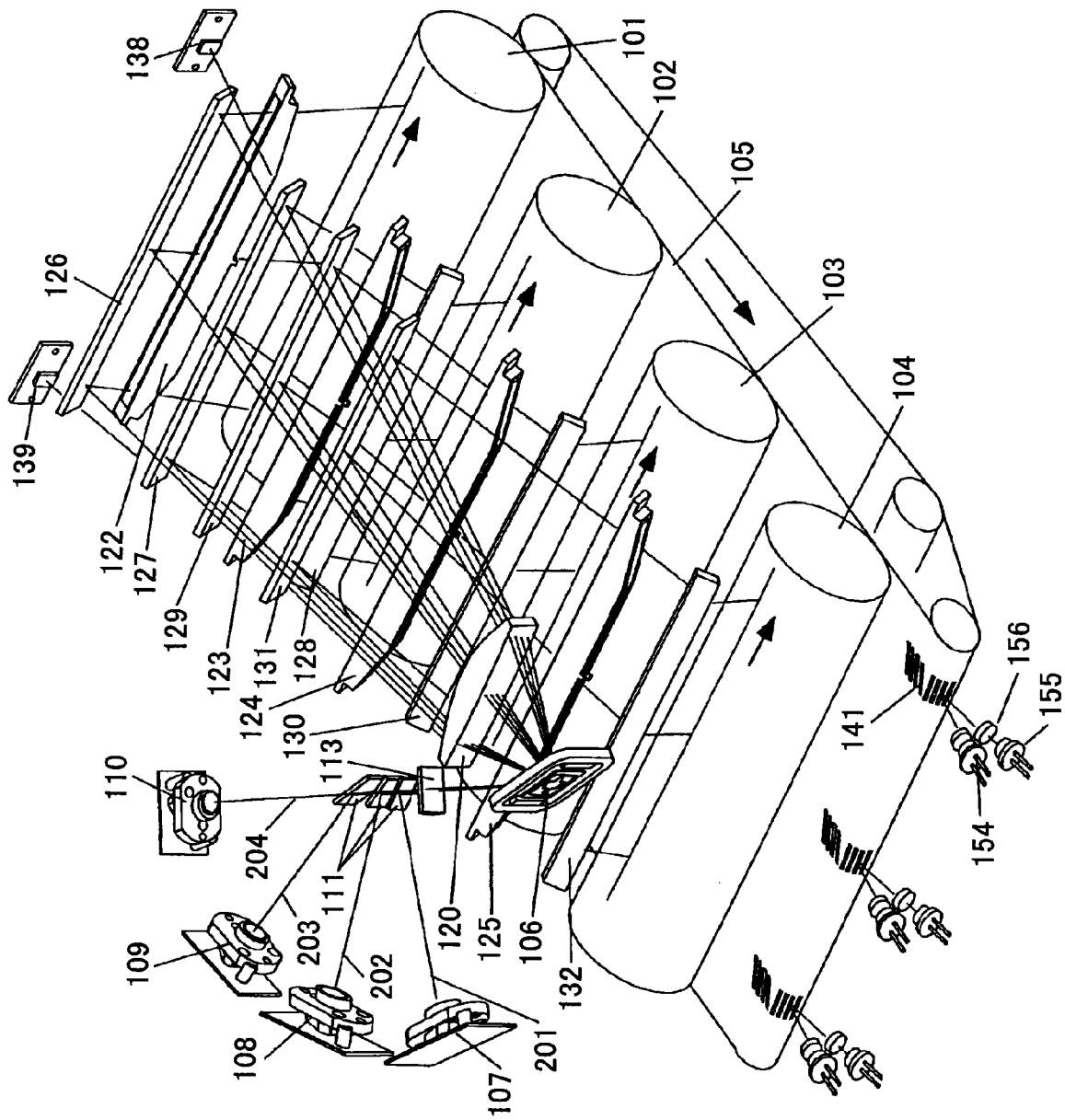
FIG. 13 is a second schematic view of the optical scanning unit of the embodiment of the present invention.

FIG. 13 is a second schematic view of the optical scanning unit of the embodiment of the present invention. More specifically, FIG. 13 shows an example of the optical scanning unit. This example is a single side scanning grazing incidence optical system where four stations are scanned by a single vibrating mirror.

As shown in FIG. 13, the optical scanning device is configured to scan each of the photosensitive bodies in a lump. The optical scanning device simultaneously forms the images by deflecting the beams from the light source units corresponding to four photosensitive drums provided with an equal interval along the moving direction 105 of the transferring subject by the vibrating mirror and then separating again and leading.

The movable mirror 106 is a single step mirror. The beam from the light source unit is made grazing incident with an incident angle different in a sub-scanning direction with the mirror so that the beams are deflected and scanned in a lump.

The basic structure of the movable mirror 106 is the same as that of the two-step movable mirror as discussed above.

The height in the sub-scanning direction of the light source units 107, 108, 109, and 110 are different from each other. The height in the sub-scanning direction of the light source unit 110 is highest. The heights are lower in the order of the light source units 109, 108, and 107 and the light source units 109, 108, and 107 are provided in a radial manner centered on incident mirrors 111.

The beam 204 from the light source unit 110 is directly incident on the movable mirror 106.

The beams 203, 203, and 201 from other light source units are reflected by the three incident mirrors 111 having gradually different heights so that the beams 203, 202, and 201 are arranged in this order.

The beams 203, 202, and 201 are incident on the cylinder lens 113 with different heights in sub-scanning directions so as to be transmitted to the movable mirror 106.

Each of the beams is converged for a while in the sub-scanning direction in the vicinities of the movable mirror surface by the cylinder lens 113. After the deflection, a gap of each of the beams is expanded so that each of the beams is separated from each other and is incident on an fθ lens 120. The fθ lens 120 is commonly used in all stations and there is no convergent power in the sub-scanning direction.

The beam from the light source unit 107 is reflected by the reflection mirror 126 and a spot for image forming is made on the photosensitive body 101 via a toroidal lens 122. As a result of this, a latent image is formed based on image information of yellow color as a first image forming station.

The beam from the light source unit 108 is reflected by the reflection mirror 127 and a spot for image forming is made on the photosensitive body 102 via a toroidal lens 123 and the reflection mirror 128. As a result of this, a latent image is formed based on image information of magenta color as a second image forming station.

The beam from the light source unit 109 is reflected by the reflection mirror 129 and a spot for image forming is made on the photosensitive body 103 via a toroidal lens 124 and the reflection mirror 130. As a result of this, a latent image is formed based on image information of cyan color as a third image forming station.

The beam from the light source unit 110 is reflected by the reflection mirror 131 and a spot for image forming is made on the photosensitive body 104 via a toroidal lens 125 and the reflection mirror 132. As a result of this, a latent image is formed based on image information of black color as a fourth image forming station.

Fourth Embodiment of the Present Invention

Next, an image forming apparatus of the embodiment of the present invention is discussed with reference to FIG. 14.

Figure 14:
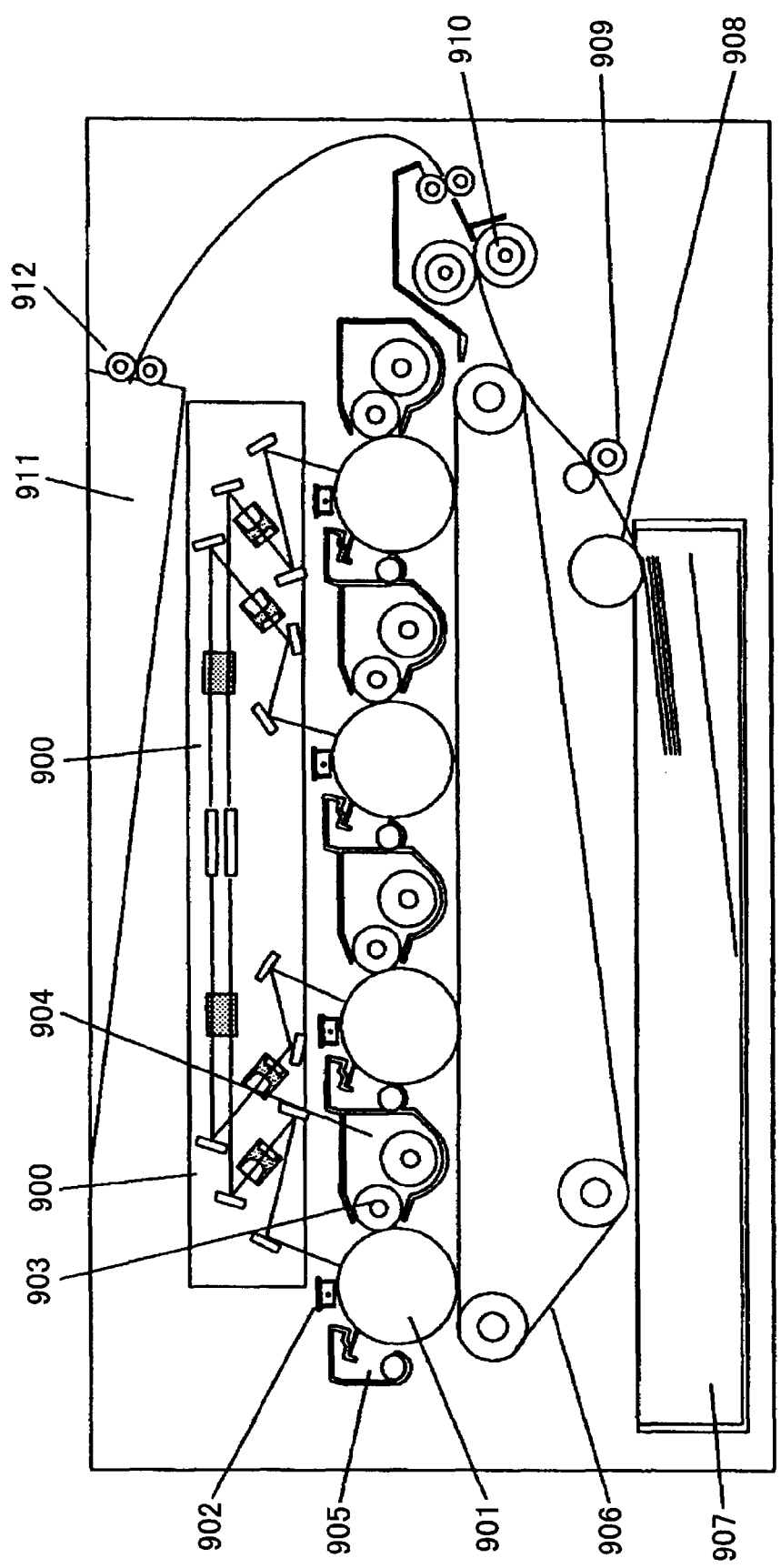
FIG. 14 is a schematic view of an image forming apparatus of the embodiment of the present invention.

Here, FIG. 14 is a schematic view of the image forming apparatus of the embodiment of the present invention. The image forming apparatus includes the optical scanning device shown in FIG. 13.

An electrostatic charger 902 that charges the photosensitive body to a high voltage, a developing roller 903 that applies toner to the charged electrostatic latent image recorded by the optical scanning device 900 to develop the image, and a toner cartridge 904 that supplies toner to the developing roller and a cleaning case 905 that scrapes off the toner remaining on the drum and stores it are arranged around a photosensitive drum 901. Image recording on the photosensitive drum is performed for two lines in one cycle by reciprocal scanning with the vibration mirror.

The image forming stations are aligned in the transport direction of a transfer belt 906. Toner images of yellow, magenta, cyan, and black are sequentially transferred onto the transfer belt 906 at suitable timings and superposed to form a color image. The image forming stations have different toner colors but basically the same structures.

On the other hand, a recording paper is fed from a paper feeding tray 907 to a paper feeding roller 908, and is fed out by a pair of register rollers 909 in accordance with the timing of starting recording in the sub-scanning direction. The toner image is transferred from the transfer belt 906, fixed by the fixing roller 910, and transporting the paper out to an output tray 911 by an outputting roller 912.

According to the embodiments of the present invention, the movable mirror includes plural mirror parts. The mirror parts have a common torsion beam and are provided with a designated separated distance in a direction parallel to the rotational shaft. Therefore, it is possible to deflect and scan beams from plural light source units in a lump so that optical scanning proper for a tandem type where color images formed by plural stations are superposed can be performed.

As discussed above, in this embodiment, the vibrating mirror includes a first substrate and a second substrate, the first substrate forms the mirror part, and the second substrate forms a vibrating plate part supported by the torsion beam.

Forming of the mirror part and forming of the vibrating plate part are implemented from the corresponding surfaces by different processes. Therefore, warping of the substrates generated by a tensile (compression) stress generated by deposition on the substrate surface or the surface stress remaining inside the substrate due to etching, can be cancelled between the substrates. As a result of this, a plane surface of the mirror surface can be maintained.

Because of this, it is possible to shrink the minute beam spot on the scanned surface so that high quality image recording can be done. In addition, even if the substrate thickness selected by the torsion beam design corresponding to the frequency of resonance vibration and the substrate thickness for securing the rigidity corresponding to deformation at the time of movable mirror oscillation are different from each other, it is possible to easily respond to this.

As discussed above, in this embodiment, the vibrating plate part includes a reinforcing beam configured to reinforce the mirror part.

Even if the substrate forming the mirror part is thin, deformation of the mirror surface due to oscillation can be prevented and the mirror part can be made light. Therefore, it is possible to shrink the minute beam spot on the scanned surface without reduction of the angle of view so that high quality image recording can be done.

As discussed above, in this embodiment, the vibrating plate part includes a mass adjusting part configured to change a mass.

Even if measurement difference between the wafers or the batches exists in the manufacturing process of the movable mirror, dispersion of the resonance frequency is prevented and the scanning line pitch between the movable mirrors can be adjusted. Therefore, it is possible to record images with high quality and without color drift or color change in a tandem type where the images formed by plural stations are superposed.

As discussed above, in this embodiment, the rotational part includes a surface coil and a permanent magnet. The surface coil is provided at the vibrating plate part, the permanent magnet forms a magnetic field in a direction perpendicular to the rotational axis, and an electric current flowing in the surface coil is controlled so that the vibrating mirror is oscillated.

Since the rotational torque corresponding to the coil length along one side parallel to the rotational axis is generated and reduction of the angle of view is not made regardless of the mirror width, it is possible to implement the same optical scanning as the polygon mirror with the resonance vibrating type movable mirror.

As discussed above, in this embodiment, the rotational part includes a beam detection part configured to detect a beam scanned by the vibrating mirror; and an electric current flowing in the surface coil is controlled based on the result of detection so that the vibrating mirror is oscillated.

The scan angle of the movable mirror is measured by the beam detection part and the scan angle can be kept constant by feedback control. Because of this, even if there is an environmental change, it is possible to make the main scanning magnifications (scanning widths in the main scanning direction) between the movable mirrors consistent with each other. Therefore, it is possible to record images with high quality and without color drift or color change in a tandem type where the images formed by plural stations are superposed.

As discussed above, in this embodiment, the rotational part gives the rotational torque in a cycle different from a resonance vibration frequency of the vibrating mirror.

The scanning frequency is set in the frequency band range but at other than the frequency of resonance vibration. Because of this, even if there is dispersion of the frequency of resonance vibration between the movable mirrors or unevenness of the dispersion of the frequency of resonance because of the change of environment, it is possible to make the main scanning magnifications (scanning widths in the main scanning direction) between the movable mirrors consistent with each other. Therefore, it is possible to make image recording with high quality and without color drift or color change in a tandem type where the images formed by plural stations are superposed.

As discussed above, in this embodiment, the optical scanning unit includes the above-discussed deflector. The optical scanning unit deflects the light beam from the light source, makes spots for image forming by the image forming optical system, and scans the scanned surface. The light source device is provided so that the light beam is deflected on the rotational axis of the movable mirror.

Even if the resonance vibration type movable mirror is used, it is possible to shrink the minute spot the same as when a polygon mirror is used on the scanned surface. In addition, it is possible to make image recording with high quality and without color drift or color change in a tandem type where the images formed by plural stations are superposed.

Furthermore, in the above-discussed embodiments, the image forming apparatus records an electrostatic image on the image carrier by the light beam from the light source device modulated by the image signal. The image forming apparatus forms an image of the electrostatic image with the toner so that the image is transferred onto the recording medium. The image forming apparatus includes the above-mentioned deflector. The light beam from the light source is deflected and a spot is formed by the image forming optical system and the image carrier is scanned. It is possible to achieve image recording with high quality that is equivalent to the quality achieved by the polygon mirror but with low noise and power consumption that are characteristic of the resonance vibrating type movable mirror.

Thus, according to the above-discussed embodiments of the present invention, it is possible to provide A deflector, including: a vibrating mirror supported by a torsion beam provided as a rotational axis and reciprocally scanning a beam from a light emitting source; and a rotational part configured to give a rotational torque to the vibrating mirror for making oscillation; wherein the rotational part generates the rotational torque along one side separated from the rotational axis by length R in a direction perpendicular to the rotational axis; and the vibration mirror has relationships of $$R<r, D>d, \text{and } D \geq d \cdot (r/R)^2$$

where width in a direction perpendicular to the rotational axis of a mirror part that is a part of the vibrating mirror is 2r; width in a direction parallel with the rotational axis of the mirror part is d; and width of the separated one side causing generation of the rotational torque is D.

In the deflector, the vibrating mirror may include a first substrate and a second substrate; the first substrate may form the mirror part; and the second substrate may form a vibrating plate part supported by the torsion beam.

In the vibrating mirror, a plurality of the mirror parts may be arranged with the designated separated distance in a direction parallel with the rotational axis, and a common torsion beam may be provided at the vibrating plate part.

The vibrating plate part may include a reinforcing beam configured to reinforce the mirror part. The vibrating plate part may include a mass adjusting part configured to change a mass.

The rotational part may includes a surface coil and a permanent magnet; the surface coil may be provided at the vibrating plate part; the permanent magnet may form a magnetic field in a direction perpendicular to the rotational axis; and an electric current flowing in the surface coil may be controlled so that the vibrating mirror is oscillated.

The rotational part may include a beam detection part configured to detect a beam scanned by the vibrating mirror; and an electric current flowing in the surface coil may be controlled based on the result of detection so that the vibrating mirror is oscillated.

The rotational part may give the rotational torque in a cycle different from a resonance vibration frequency of the vibrating mirror.

Even if the mirror width becomes larger as the light flux diameter deflected by the mirror part is expanded, it is possible to secure the rotational torque sufficient to supplement this and not reduce the angle of the field. Therefore, it is possible to shrink a minute beam spot on the scanned surface so that a high quality image recoding can be made.

It is also possible to provide an optical scanning unit, including: a deflector including a vibrating mirror supported by a torsion beam provided as a rotational axis and reciprocally scanning a light beam from a light emitting source; and a rotational part configured to give a rotational torque to the vibrating mirror for making oscillation; wherein the rotational part generates the rotational torque along one side separated from the rotational axis by length R in a direction perpendicular to the rotational axis; the vibration mirror has relationships of $$R<r, D>d, \text{and } D \geq d \cdot (r/R)^2$$

where width in a direction perpendicular to the rotational axis of a mirror part that is a part of the vibrating mirror is 2r; width in a direction parallel with the rotational axis of the mirror part is d; and width of the separated one side causing generation of the rotational torque is D; the light beam from the light source is deflected and a spot shape is formed by an image-formation optical system, so that a surface is scanned; and the light source is provided so that the light beam is deflected toward the rotational axis of the vibrating mirror.

It is also possible to provide an image forming apparatus wherein an electrostatic image is recorded on an image carrier by a light beam from a light source device modulated by an image signal and the electrostatic image is transformed by a toner so as to be transferred to a recording medium, the image forming apparatus including: an optical scanning unit having a deflector including a vibrating mirror supported by a torsion beam provided as a rotational axis and reciprocally scanning the light beam from the light source device; and a rotational part configured to give a rotational torque to the vibrating mirror for making oscillation; wherein the rotational part generates the rotational torque along one side separated from the rotational axis by length R in a direction perpendicular to the rotational axis; the vibration mirror has relationships of $$R<r, D>d, \text{and } D \geq d \cdot (r/R)^2$$

where width in a direction perpendicular to the rotational axis of a mirror part that is a part of the vibrating mirror is 2r; width in a direction parallel with the rotational axis of the mirror part is d; and width of the separated one side causing generation of the rotational torque is D; a light beam from a light source device is deflected and a spot shape is formed by an image-formation optical system, so that a surface is scanned; and the light source device is provided so that the light beam is deflected toward the rotational axis of the vibrating mirror.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

This patent application is based on Japanese Priority Patent Application No. 2006-205431 filed on Jul. 27, 2006, the entire contents of which are hereby incorporated by reference.

What is claimed is:

1. A deflector, comprising:
   a vibrating mirror to reciprocally scan a beam from a light emitting source, the vibrating mirror including
   a vibrating plate part supported by a torsion beam, the torsion beam provided as a rotational axis, and
   a movable mirror having a first edge and a second edge, the movable mirror formed in a body with the vibrating mirror; and
   a rotational part configured to give a rotational torque to the vibrating mirror for making oscillation, the rotational torque being generated along a first side of the vibrating plate part, the first side having a width D and being parallel with and spaced apart from the rotational axis by length R in a direction perpendicular to the rotational axis, such that the first side of the vibrating plate part is nearer to the rotational axis than the first edge of the movable mirror, wherein
   the vibrating mirror has relationships of $$R<r, D>d, \text{and } D \geq d \cdot (r/R)^2$$

where a width of the second edge of the movable mirror in a direction perpendicular to the rotational axis is 2r, such that the width 2r of the second edge of the movable mirror is greater than a width 2R of a second side of the vibrating plate part, the second side of the vibrating plate part being perpendicular to the rotational axis; a width of the first edge of the movable mirror in a direction parallel with the rotational axis is d, such that the width D of the first side of the vibrating plate part is greater than the width d of the first edge of the movable mirror.

2. The deflector as claimed in claim 1,
wherein the vibrating mirror includes a first substrate and a second substrate;
the first substrate forms the mirror part; and
the second substrate forms the vibrating plate part supported by the torsion beam.

3. The deflector as claimed in claim 2,
wherein, in the vibrating mirror, a plurality of the mirror parts is arranged with a designated separated distance in a direction parallel with the rotational axis, and a common torsion beam is provided at the vibrating plate part.

4. The deflector as claimed in claim 2,
wherein the vibrating plate part includes a reinforcing beam configured to reinforce the mirror part.

5. The deflector as claimed in claim 2,
wherein the vibrating plate part includes a mass adjusting part configured to change a mass.

6. The deflector as claimed in claim 2,
wherein the rotational part includes a surface coil and a permanent magnet;
the surface coil is provided at the vibrating plate part;
the permanent magnet forms a magnetic field in a direction perpendicular to the rotational axis; and
an electric current flowing in the surface coil is configured to be controlled so that the vibrating mirror is oscillated.

7. The deflector as claimed in claim 6,
wherein the rotational part includes a beam detection part configured to detect a beam scanned by the vibrating mirror; and
an electric current flowing in the surface coil is configured to be controlled based on the result of detection so that the vibrating mirror is oscillated.

8. The deflector as claimed in claim 1,
wherein the rotational part gives the rotational torque in a cycle different from a resonance vibration frequency of the vibrating mirror.

9. An optical scanning unit, comprising:
a deflector including
a vibrating mirror to reciprocally scan a beam from a light emitting source, the vibrating mirror including
a vibrating plate part supported by a torsion beam, the torsion beam provided as a rotational axis, and
a movable mirror having a first edge and a second edge, the movable mirror formed in a body with the vibrating mirror; and
a rotational part configured to give a rotational torque to the vibrating mirror for making oscillation, the rotational torque being generated along a first side of the vibrating plate part, the first side having a width D and being parallel with and spaced apart from the rotational axis by length R in a direction perpendicular to the rotational axis, such that the first side of the vibrating plate part is nearer to the rotational axis than the first edge of the movable mirror, wherein
the vibrating mirror has relationships of $$R<r, D>d, \text{ and } D \geqq d \cdot (r/R)^2$$

where a width of the second edge of the movable mirror in a direction perpendicular to the rotational axis is 2r, such that the width 2r of the second edge of the movable mirror is greater than a width 2R of a second side of the vibrating plate part, the second side of the vibrating plate part being perpendicular to the rotational axis; a width of the first edge of the movable mirror in a direction parallel with the rotational axis is d, such that the width D of the first side of the vibrating plate part is greater than the width d of the first edge of the movable mirror;
the light beam from the light emitting source is deflected and a spot shape is formed by an image-formation optical system, so that a surface is scanned; and
the light emitting source is provided so that the light beam is deflected toward the rotational axis of the vibrating mirror.

10. An image forming apparatus wherein an electrostatic image is recorded on an image carrier by a light beam from a light source device modulated by an image signal and the electrostatic image is transformed by a toner so as to be transferred to a recording medium, the image forming apparatus comprising:
an optical scanning unit having a deflector including
a vibrating mirror to reciprocally scan the light beam from the light source device, the vibrating mirror including
a vibrating plate part supported by a torsion beam, the torsion beam provided as a rotational axis, and
a movable mirror having a first edge and a second edge, the movable mirror formed in a body with the vibrating mirror; and
a rotational part configured to give a rotational torque to the vibrating mirror for making oscillation, the rotational torque being generated along a first side of the vibrating plate part, the first side having a width D and being parallel with and spaced apart from the rotational axis by length R in a direction perpendicular to the rotational axis, such that the first side of the vibrating plate part is nearer to the rotational axis than the first edge of the movable mirror, wherein
the vibrating mirror has relationships of $$R<r, D>d, \text{ and } D \geqq d \cdot (r/R)^2$$

where a width of the second edge of the movable mirror in a direction perpendicular to the rotational axis is 2r, such that the width 2r of the second edge of the movable mirror is greater than a width 2R of a second side of the vibrating plate part, the second side of the vibrating plate part being perpendicular to the rotational axis; a width of the first edge of the movable mirror in a direction parallel with the rotational axis is d, such that the width D of the first side of the vibrating plate part is greater than the width d of the first edge of the movable mirror;
the light beam from the light source device is deflected and a spot shape is formed by an image-formation optical system, so that a surface is scanned; and
the light source device is provided so that the light beam is deflected toward the rotational axis of the vibrating mirror.

* * * * *